United States Patent
Agarwal

(10) Patent No.: US 8,526,452 B1
(45) Date of Patent: Sep. 3, 2013

(54) QUALITY OF SERVICE PACKET SCHEDULER DESIGN

(75) Inventor: Anil Agarwal, North Potomac, MD (US)

(73) Assignee: ViaSat, Inc., Carlsbad, CA (US)

( * ) Notice: Subject to any disclaimer, the term of this patent is extended or adjusted under 35 U.S.C. 154(b) by 325 days.

(21) Appl. No.: 12/835,438

(22) Filed: Jul. 13, 2010

Related U.S. Application Data

(60) Provisional application No. 61/225,055, filed on Jul. 13, 2009.

(51) Int. Cl.
*H04L 12/56* (2006.01)

(52) U.S. Cl.
USPC .......................................... 370/412; 370/429

(58) Field of Classification Search
None
See application file for complete search history.

(56) References Cited

U.S. PATENT DOCUMENTS

| | | | |
|---|---|---|---|
| 7,697,436 B2* | 4/2010 | Wu et al. | 370/235 |
| 8,369,219 B2* | 2/2013 | Acharya et al. | 370/235 |
| 2003/0174650 A1* | 9/2003 | Shankar et al. | 370/235 |
| 2004/0066746 A1* | 4/2004 | Matsunaga | 370/235 |
| 2004/0090974 A1* | 5/2004 | Balakrishnan et al. | 370/412 |
| 2004/0213156 A1* | 10/2004 | Smallwood et al. | 370/232 |
| 2005/0163048 A1* | 7/2005 | Arora et al. | 370/230 |
| 2005/0271084 A1* | 12/2005 | Bruckman et al. | 370/468 |

* cited by examiner

*Primary Examiner* — Timothy J Weidner
(74) *Attorney, Agent, or Firm* — Kilpatrick Townsend & Stockton LLP

(57) ABSTRACT

Systems, methods, devices, and processors are described for quality of service (QoS) packet scheduling in satellite communications systems. A packet received at the QoS packet scheduler may be assigned a virtual departure time utilizing novel self-clocked fair queuing techniques. The virtual departure time for a packet assigned to a queue may depend on a different weight assigned to the queues. Queues may be treated as low latency queues in some cases and may be provided with committed information rates in other cases. Low latency queues may be assigned weights equal to infinity, or the reciprocal of the weight equal to zero. Queues with committed information rates may assign different weights to packets depending on whether the rate that packets are received exceeds the committed information rate. Packets may then be scheduled based on their virtual departure time order.

24 Claims, 13 Drawing Sheets

QUALITY OF SERVICE PACKET SCHEDULER DESIGN

CROSS-REFERENCES TO RELATED APPLICATIONS

This application is a non-provisional claiming priority benefit of U.S. provisional patent application Ser. No. 61/225,055, filed on Jul. 13, 2009 and entitled "Quality of Service Packet Scheduler Design," the entire disclosure of which is herein incorporated by reference for all purposes.

BACKGROUND

Embodiments relate to communications in general and, in particular, to packet scheduling in satellite communications using self-clocked fair queuing.

There are many different types of queuing techniques in packet scheduler design. Priority schedulers may assign a queue N with a higher priority than another queue N−1. Weighted schedulers may assign a weight to each queue such that each queue may be guaranteed a fraction of a total link in proportion to its weight. Weighted schedulers may include methods such as weighted fair queuing (WFQ), deficit weighted round-robin (DWRR), and self-clocked fair queuing (SCFQ), for example. WFQ schedulers are very popular in the routing world. For example, different traffic classes may be guaranteed a fraction of a link capacity. WFQ schedulers may typically be implemented where the link rate may be fixed.

Systems such as DVB-S2 and satellite systems in general, however, may have variable link rates. Furthermore, WFQ schedulers may cause delay for some time sensitive packets, such as voice packets. Guaranteeing a fixed fraction of bandwidth may, standing alone, not provide sufficient performance for certain traffic classes (e.g., voice, video) in certain instances. Therefore, it may be desirable to identify novel techniques for scheduling packets in an efficient manner to provide an absolute rate guarantee (in Mbps, for example) to certain classes of traffic, while sharing the excess in weighted proportion.

BRIEF SUMMARY

Systems, methods, devices, and processors are described for quality of service (QoS) packet scheduling in satellite communications systems. A stream of packets may be received at a gateway for distribution to terminals in a satellite communications system. A QoS packet scheduler may be used to filter and forward packets according to several different novel QoS parameters.

Packets received at the QoS packet scheduler may be assigned a virtual departure time utilizing novel self-clocked fair queuing techniques. The virtual departure time for a packet assigned to a queue may depend on a weight assigned to the queue. Packets may then be scheduled based on their virtual departure time order.

In some embodiments, a queue may be treated as a low latency queue. A low latency queue may have its weight set to infinity or equivalently having 1/weight set to zero. Any queue or set of queues may be treated this way. A set of low latency queues may be treated equally in some embodiments, but have higher priority over non-low latency queues. In another embodiment, low latency queues may be prioritized amongst themselves, while retaining their higher priority over non-low latency queues utilizing two sets of weights that cover significantly different ranges.

In some embodiments, a method of self-clocked fair queuing with low latency for a satellite communication system is provided. The method may include receiving multiple packets. A first subset of packets from the multiple packets may be assigned to a low latency queue from multiple queues. Virtual departure times may be assigned to one or more of the packets from the first subset of packets equal to a virtual departure time of a previous packet in the low latency queue. The one or more packets may be transmitted based on the virtual departure times assigned to the one or more packets.

Some embodiments of the self-clocked fair queuing with low latency for a satellite communication system may include scheduling the one or more packets for transmission before a packet from another queue of the multiple queues that is assigned the same virtual departure time. Some embodiments may include assigning virtual departure times to one or more packets from the first subset equal to a virtual departure time of a last scheduled packet from another queue from the multiple queues.

Some embodiments of the self-clocked fair queuing with low latency for a satellite communication system may include assigning a weight to the low latency queue such that a reciprocal of the weight of the low latency queue equals substantially zero. Assigning the virtual departure time to the one or more packets from the first subset may depend on the weight assigned to the low latency queue. Some embodiments may include assigning a weight to a second queue from the multiple queues such that the reciprocal of the weight of the second queue is greater than zero.

In some embodiments, a self-clocked fair queuing device with low latency for a satellite communication system is provided. The device may include a sorter module configured to receive packets from multiple terminals in the satellite communication system. The sorter module may assign a first subset of packets from the multiple packets to a low latency queue from multiple queues. The device may include a virtual departure time assigner module configured to assign virtual departure times to one or more of the packets from the first subset of packets equal to a virtual departure time of a previous packet in the low latency queue. The device may include an ordering module configured to order the one or more packets for transmission based on the virtual departure times assigned to the one or more packets.

Some embodiments of the self-clocked fair queuing device with low latency for a satellite communication system may include a virtual departure time assigner module that is further configured to assign a weight to the low latency queue such that a reciprocal of the weight of the low latency queue equals substantially zero. Furthermore, assigning the virtual departure time to the one or more packets from the first subset may depend on the weight assigned to the low latency queue.

In some embodiments, a self-clocked fair queuing device with low latency for a satellite communication system is provided. The device may include a means for receiving multiple packets. The device may include a means for assigning a first subset of packets from multiple packets to a low latency queue from multiple queues. The device may include a means for assigning virtual departure times to one or more of the packets from the first subset of packets equal to a virtual departure time of a previous packet in the low latency queue. The device may include a means for transmitting the one or more packets based on the virtual departure times assigned to the one or more packets.

Some embodiments of the self-clocked fair queuing device with low latency for a satellite communication system may include a means for assigning a weight to the low latency queue such that a reciprocal of the weight of the low latency queue equals substantially zero. Furthermore, assigning the virtual departure time to the one or more packets from the first subset may depend on the weight assigned to the low latency queue. Some embodiments of the self-clocked fair queuing device with low latency for a satellite communication system may include a means for assigning a weight to a second queue from the multiple queues such that the reciprocal of the weight of the second queue is greater than zero. The device may include a means for assigning one or more the packets from a second subset of packets from the multiple packets to the second queue from the multiple queues. The device may include a means for assigning virtual departure times to the one or more packets assigned to the second queue that depend on the weight assigned to the second queue.

In another set of embodiments, queues may be provided with committed information rates, or other guaranteed bandwidth, while sharing excess bandwidth in weighted proportion. Packets may be marked as conforming or non-conforming based on whether the rate that packets are received by a queue does not exceed the committed information rate for the queue. Conforming packets may be assigned virtual departure times based on a weight equal to infinity (or 1/weight=0), while non-conforming packets may be assigned a weight less than infinity (or 1/weight>0). Other embodiments may also handle situations where there may not be enough bandwidth to meet the committed information rate for the queues. Virtual departure times for conforming packets may be based on a set of committed information rate weight values that may be relatively large compared to weight values used for non-conforming packets.

In some embodiments, a method of self-clocked fair queuing with a committed information rate for a satellite communication system is provided. The method may include identifying a first set of packets among multiple received packets for a first queue of multiple queues. A receiving rate associated with the first set of packets may be identified. A first designation may be associated with each packet of the first set of packets when the receiving rate is less than or equal the committed information rate. The first designation may be associated with each packet from at least a first subset of the first set of packets and a second designation may be associated with each packet from at least a second subset of the first set of packets when the receiving rate is greater than the committed information rate. Virtual departure times may be assigned to respective packets from the first set of packets based on the designation associated with respective packet such that packets associated with the first designation are assigned virtual departure times with earlier virtual departure times than packets associated with the second designation. The respective packets may be transmitted based on their respective virtual departure times.

Some embodiments of the method of self-clocked fair queuing with a committed information rate for a satellite communication system may include the second subset of the first set of packets representing one or more packets received as part of an excess rate, where the excess rate represents a difference between the receiving rate and the committed information rate.

Some embodiments of the method of self-clocked fair queuing with a committed information rate for a satellite communication system may include associating the first designation with a first weight. The method may include associating the second designation with a second weight. Assigning the virtual departure times to respective packets may depend on the weight associated with the respective designation. Some embodiments of the method of self-clocked fair queuing with a committed information rate for a satellite communication system that associate the first designation with the first weight may include the first weight such that a reciprocal of the first weight is substantially equal to zero. The second weight may be such that a reciprocal of the second weight is greater than zero.

In some embodiments, a self-clocked fair queuing device with a committed information rate for a satellite communication system is provided. The device may include a sorter module configured to identify a first set of packets among multiple received packets for a first queue. The device may include a rate monitor module configured to identify a receiving rate associated with the first set of packets. The rate monitor module may associate a first designation with each packet of the first set of packets when the receiving rate is less than or equal the committed information rate. The rate monitor module may associate the first designation with each packet from at least a first subset of the first set of packets and a second designation with each packet from at least a second subset of the first set of packets when the receiving rate is greater than the committed information rate. The device may include a virtual departure time assigner module configured to assign virtual departure times to respective packets from the first set of packets based on the designation associated with respective packet such that packets associated with the first designation are assigned virtual departure times with earlier virtual departure times than packets associated with the second designation. The device may include an ordering module configured to order the respective packets for transmission based on their respective virtual departure times.

Some embodiments of the self-clocked fair queuing device with a committed information rate for a satellite communication system may include a virtual departure time assigner module that is further configured to associate the first designation with a first weight. The virtual departure time assigner module may associate the second designation with a second weight. Assigning the virtual departure times to respective packets may depend on the weight associated with the respective designation. Some embodiments may include a virtual departure time assigner module that associates the first designation with the first weight such that a reciprocal of the first weight is substantially equal to zero. The virtual departure time assigner module associate the second designation with the second weight such that a reciprocal of the second weight is greater than zero.

In some embodiments, a self-clocked fair queuing device with a committed information rate for a satellite communication system is provided. The device may include a means for identifying a first set of packets among multiple received packets for a first queue of a plurality of queues. The device may include a means for identifying a receiving rate associated with the first set of packets. The device may include a means for associating a first designation with each packet of the first set of packets when the receiving rate is less than or equal the committed information rate. The device may include a means for associating the first designation with each packet from at least a first subset of the first set of packets and a second designation with each packet from at least a second subset of the first set of packets when the receiving rate is greater than the committed information rate. The device may include a means for assigning virtual departure times to respective packets from the first set of packets based on the designation associated with respective packet such that packets associated with the first designation are assigned virtual departure times with earlier virtual departure times than packets associated with the second designation. The device may include a means for transmitting the respective packets based on their respective virtual departure times.

Some embodiments of the self-clocked fair queuing device with a committed information rate for a satellite communication system may include a means for associating the first designation with a first weight. The device may include a means for associating the second designation with a second weight. Assigning the virtual departure times to respective packets may depend on the weight associated with the respective designation. Some embodiments of the device that may include the means for associating the first designation with the first weight such that a reciprocal of the first weight is substantially equal to zero. Furthermore, the means for associating the second designation with the second weight may be such that a reciprocal of the second weight is greater than zero.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
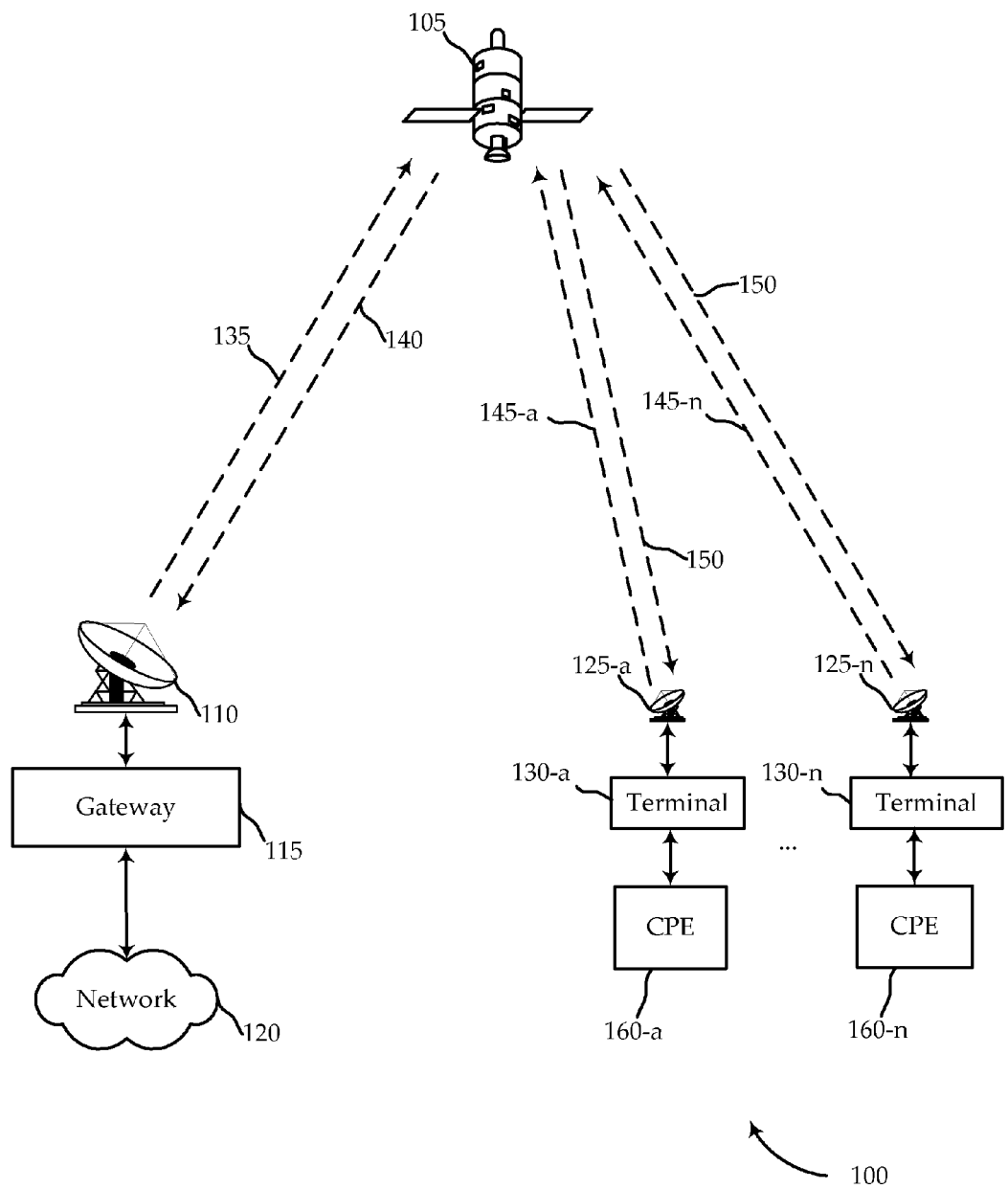
FIG. 1 is a block diagram of a satellite communication system according to various embodiments.

Systems, methods, devices, and processors are described for QoS packet scheduling in satellite communications systems. A stream of packets may be received at a gateway for distribution to terminals in a satellite communications system. A QoS packet scheduler may be used to filter and forward packets according to QoS parameters. A packet received at the QoS packet scheduler may be assigned a virtual departure time utilizing novel self-clocked fair queuing techniques. The virtual departure time for a packet assigned to a queue may depend on a different weight assigned to the queues. Queues may be treated as low latency queues in some cases and may be provided with committed information rates in other cases. Packets may then be scheduled based on their virtual departure time order.

In some embodiments, a queue may be treated as a low latency queue. A low latency queue may have its weight set to infinity or equivalently having 1/weight set to zero. Any queue or set of queues may be treated this way. A set of low latency queues may be treated equally in some embodiments, but have higher priority over non-low latency queues. In another embodiment, low latency queues may be prioritized amongst themselves, while retaining their higher priority over non-low latency queues utilizing two sets of weights that cover significantly different ranges.

In another set of embodiments, queues may be provided with committed information rates, or other guaranteed bandwidth, while sharing excess bandwidth in weighted proportion. Packets may be marked as conforming or non-conforming based on whether the rate that packets are received by a queue does not exceed the committed information rate for the queue. Conforming packets may be assigned virtual departure times based on a weight equal to infinity (or 1/weight=0), while non-conforming packets may be assigned a weight less than infinity (or 1/weight>0). Other embodiments may also handle situations where there may not be enough bandwidth to meet the committed information rate for the queues. Virtual departure times for conforming packets may be based on a set of committed information rate weight values that may be relatively large compared to weight values used for non-conforming packets.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Referring first to FIG. 1, a block diagram illustrates an example satellite communications system 100 configured according to various embodiments. While a satellite communications system is used to illustrate various aspects of the invention, it is worth noting that the scheduling principles set forth herein are applicable to a number of other wireless and other communication systems, as well. The satellite communications system 100 includes a network 120, such as the Internet, interfaced with a gateway 115 that is configured to communicate with one or more subscriber terminals 130, via a satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network may connect the gateway 115 with other gateways (not shown), which are also in communication with the satellite 105, and which may share information on link conditions and other network metrics.

The gateway 115 provides an interface between the network 120 and the subscriber terminals 130. The gateway 115 may be configured to receive data and information directed to one or more subscriber terminals 130, and format the data and information (e.g., ACM) for delivery downstream to the respective subscriber terminals 130 via the satellite 105. Similarly, the gateway 115 may be configured to receive upstream signals from the satellite 105 (e.g., from one or more subscriber terminals 130) directed to a destination in the network 120, and can format the received signals for transmission through the network 120.

A device (not shown) connected to the network 120 may, therefore, communicate with one or more subscriber terminals 130 through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the DVB-S2 and WiMAX standards. In a number of embodiments, the gateway 115 utilizes a QoS packet scheduler in conjunction with one or more of the traffic control and shaping techniques described herein to direct traffic to the individual terminals. The gateway 115 may use a broadcast signal, with a modulation and coding (modcode) format adapted for each packet to the link conditions of the terminal 130 or set of terminals 130 to which the packet is directed (e.g., to account for the variable service link 150 conditions from the satellite 105 to each respective terminal 130).

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. Each single carrier signal may be divided in time (e.g., using TDMA or other time-division multiplexing techniques) into a number of sub-channels. The sub-channels may be the same size, or different sizes, and a range of options will be addressed below. In some embodiments, other channelization schemes may be integrated with or used in place of time-divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more subscriber terminals 130. In one embodiment, the satellite 105 operates in a multi-beam mode, transmitting a number of narrow beams, each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The service signals transmitted from the satellite 105 may be received by one or more subscriber terminals 130, via the respective antenna 125. In one embodiment, the antenna 125 and subscriber terminal 130 together make up a very small aperture terminal (VSAT). In other embodiments, a variety of other types of antennas 125 may be used at the subscriber terminal 130 to receive the signal from the satellite 105. Each of the subscriber terminals 130 may be a single user terminal or, alternatively, be a hub or router (not pictured) that is coupled with multiple user terminals. Each subscriber terminal 130 may be connected to consumer premises equipment (CPE) 160 (e.g., computers, local area networks, Internet appliances, wireless networks, etc.).

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time-Division Multiple Access (TDMA) scheme is then employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as TDMA, FDMA, OFDMA, CDMA, or any number of hybrid or other schemes known in the art.

A subscriber terminal 130 may transmit packets to gateway 115 via the satellite 105. The packets transmitted between the gateway 115 and subscriber terminals 130 may be for different traffic classes such as voice, video, and data, merely by way of example.

Figure 2:
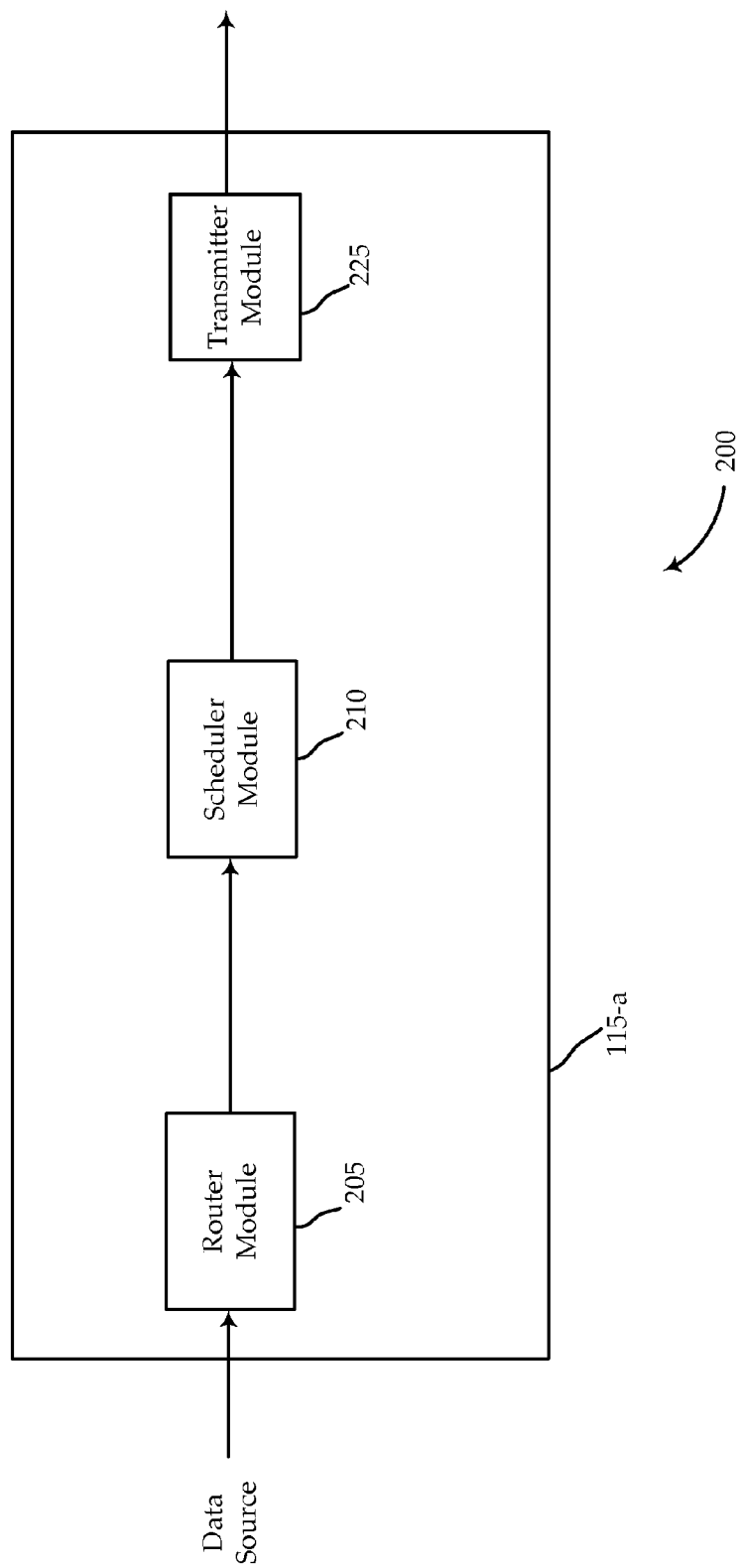
FIG. 2 is a simplified block diagram illustrating an example configuration of a gateway device according to various embodiments.

Referring next to FIG. 2, a simplified block diagram illustrates an example configuration 200 of a device 115-*a* according to various embodiments. The device 115-*a* may be gateway 115 of FIG. 1, transmitting packets downstream based on self-clocked fair queuing techniques.

The device 115-a in this embodiment includes a router module 205, a scheduler module 210, and a transmitter module 225. These components (205-225) may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each may also be implemented, in whole or in part, with instructions embodied in a computer-readable medium, formatted to be executed by one or more general or application specific processors. Thus, the device 200 may include different types and configurations of memory, which may be integrated into the hardware or may be one or more separate components.

Turning now to the packet flow, a data packet may travel through a router module 205 to determine the outbound interface for the received packet. In some embodiments, router module 205 may be referred to as a receiver module. The scheduler module 210 may then buffer the received packets. The scheduler module 210 may filter and forward the outgoing packets using a variety of novel self-clocked fair queuing metrics, discussed in more detail below. Self-clocked fair queuing techniques in some embodiments may generally involve assigning a virtual departure time to a packet for a queue (not shown) in the scheduler module 210 based on a weight assigned to the queue. A variety of queuing methods may be used, as there may be virtual queues (e.g., using a linked list), or queues may be associated with certain areas of memory. The virtual departure time for a packet associated with a queue may depend on whether or not the associated queue already has packets. For example, when a packet is associated with a queue i that already contains packets, a virtual departure time may be assigned to the packet based the virtual departure time of the previous packet in queue i and the packet's size relative to the queue's weight, as seen in an equation such as:

$$VDTi = VDTi \text{ of previous packet in queue } i + (\text{packet size/weight } i) \quad (A),$$

where weight i may be in units such that when the packet size is divided by the weight, the resulting unit is time. Merely by way of example, a weight may be in units of Megabits per second (Mbps). When a queue i is empty when the packet arrives, the packet may be assigned a virtual departure time based on the last scheduled virtual departure time for a packet in any queue and the packet's size relative to the queue's weight, as seen in an equation such as the following:

$$VDTi = VDTi \text{ of last scheduled packet for any queue} + (\text{packet size/weight } i) \quad (B).$$

Different weights may be assigned to different queues as described in more detail below. For example, various traffic classes may be associated with the received packets, and a number of different self-clocked fair queuing weighting techniques discussed in more detail below may be utilized. Various self-clocked fair queuing weighting functions may be used to give different classes a greater proportion of the available bandwidth or expedited queuing. Certain receiving subscriber terminals 130 may also receive some measure of preference. Although use of virtual departure times is described, in certain embodiments, other techniques may be used.

The scheduler module 210 may then forward packets to the transmitter module 225 based on the virtual departure times of the packets. The scheduler module 210 may forward packets to the transmitter module 225 individually or in groups. In some embodiments, packets forwarded from the scheduler module 210 may be processed before reaching the transmitter module. For example, modcodes may be assigned to the packets in some embodiments. Packets sent as groups may also be reorganized into clusters based on their modcodes and inserted to a baseband frame before being forwarded to the transmitter module 225 in some embodiments.

Figure 3:
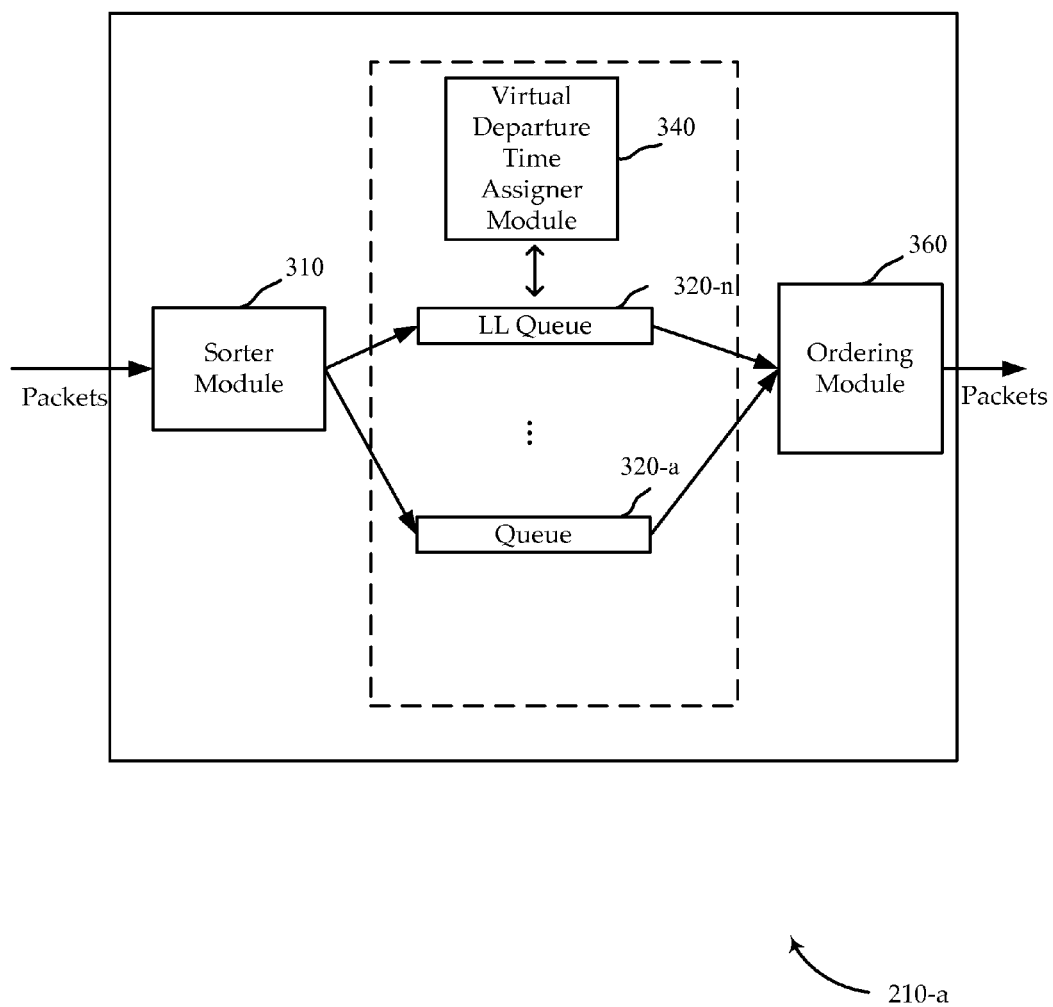
FIG. 3 is a simplified block diagram illustrating an example configuration of a scheduler module according to various embodiments.

I. Low Latency Self-Clocked Fair Queuing:

Referring to FIG. 3, a simplified block diagram illustrates an example configuration of a scheduler module 210-a according to various embodiments. Scheduler module 210-a may be referred to as a self-clocked fair queuing device with low latency in some embodiments. The scheduler module 210-a may be implemented in the gateway 115 of FIG. 1 or 2, scheduling packets for transmission downstream based on several novel self-clocked fair queue weighting and/or priority schemes described below. Low latency queuing may allow for one or more queues to be treated with high priority. Low latency queuing may be utilized to reduce delay and/or jitter in the transmission of packet sessions in some embodiments. Low latency queuing may be used to ensure low delay and/or jitter for voice and/or video packets, for example.

Scheduler module 210-a may include a variety of components, including queues such as 320-a, . . . , 320-n. One or more queues may be treated as low latency queues, such as queue 320-n. Queues treated as low latency queues may be treated with higher priority than queues not treated as low latency queues. Scheduler module 210-a may include a sorter module 310 that may be configured to receive packets from multiple terminals in a satellite communication system. Sorter module 310 may assign packets from the different terminals to different queues such as queues 320-a, . . . , 320-n for example. Scheduler module 210-a may also include a virtual departure time assigner module 340, which may assign virtual departure times to packets. In some embodiments, virtual departure time assigner module 340 may also assign weights to queues 320. Scheduler module 210-a may also include a packet scheduler, such as ordering module 360. Ordering module 360 may schedule packets for transmission according to the virtual departure time order of the packets. In some embodiments, ordering module 360 may be referred to as a self-clocked fair queuing scheduler. These components are discussed in more detail below.

These components (310-360) may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each may also be implemented, in whole or in part, with instructions embodied in a computer-readable medium, formatted to be executed by one or more general or application specific processors. Thus, scheduler module 210-a may include different types and configurations of memory (not shown), which may be integrated into the hardware or may be one or more separate components.

In some embodiments, sorter module 310 may be configured to receive packets from multiple terminals in a satellite communication system. Sorter module 310 may assign packets from the different terminals to different queues such as queues 320-a, . . . , 320-n. In one embodiment, sorter module 310 may assign a first subset of packets from the multiple packets to a low latency queue, such as queue 320-n, from the multiple queues. In some embodiments, virtual departure time assigner 340 may assign virtual departure times to one or more of the packets from the first subset of packets equal to a virtual departure time of a previous packet in the low latency queue 320-n. Ordering module 360 may be configured to order and to transmit the one or more packets based on the virtual departure times assigned to the one or more packets.

In some embodiments, virtual departure time assigner module 340 may be configured to assign a virtual departure time to one or more packets from a low latency queue equal to a virtual departure time of a last scheduled packet from any of the other queues. For example, if a low latency queue does not already contain a packet when another packet is assigned to the packet, virtual departure time assigner module 340 may assign a virtual time of a last scheduled packet from any of the other queues.

In some embodiments, ordering module 360 may order the one or more packets from the low latency queue based on the virtual departure times such that the one or more packets are ordered for transmission before a packet from another queue of the multiple queues that is assigned the same virtual departure time.

In some embodiments, virtual departure time assigner module 340 may assign weights to queues, which may be used to determine the virtual departure times. For example, a weight may be assigned to the low latency queue such that a reciprocal of the weight of the low latency queue equals substantially zero. In some cases, the weight may be considered infinite. In one embodiment, for example, virtual departure time assigner 340 may assign virtual departure times to the one or more packets from the first subset that depends on the weight assigned to the low latency queue. Some embodiments may utilize a different module, such as a weighting module (not shown) to assign weights to the different queues.

In some embodiments, virtual departure time assigner module 340 may be further configured to assign a weight to queues that may not be considered low latency queues, such as queue 320-a. In some embodiments, the reciprocal of the assigned weight of such a queue may be greater than zero; in other words, the weight of the queue is less than infinite. Virtual departure time assigner module 340 may then assign a virtual departure time to packets from this queue based on the weight of the queue.

In some embodiments, virtual departure time scheduler module 340 may assign a weight to another queue that may be considered a prioritized queue with a weight between the weights of the other queues. For example, virtual time assigner module 340 may assign a weight to a third queue (not shown) such that the weight of the third queue is at least two orders of magnitude larger than the weight assigned a queue such as queue 320-a.

In some embodiments, the weight assigned to at least one of the queues depends on a type of traffic of the packets received by the respective queue.

Figure 4:
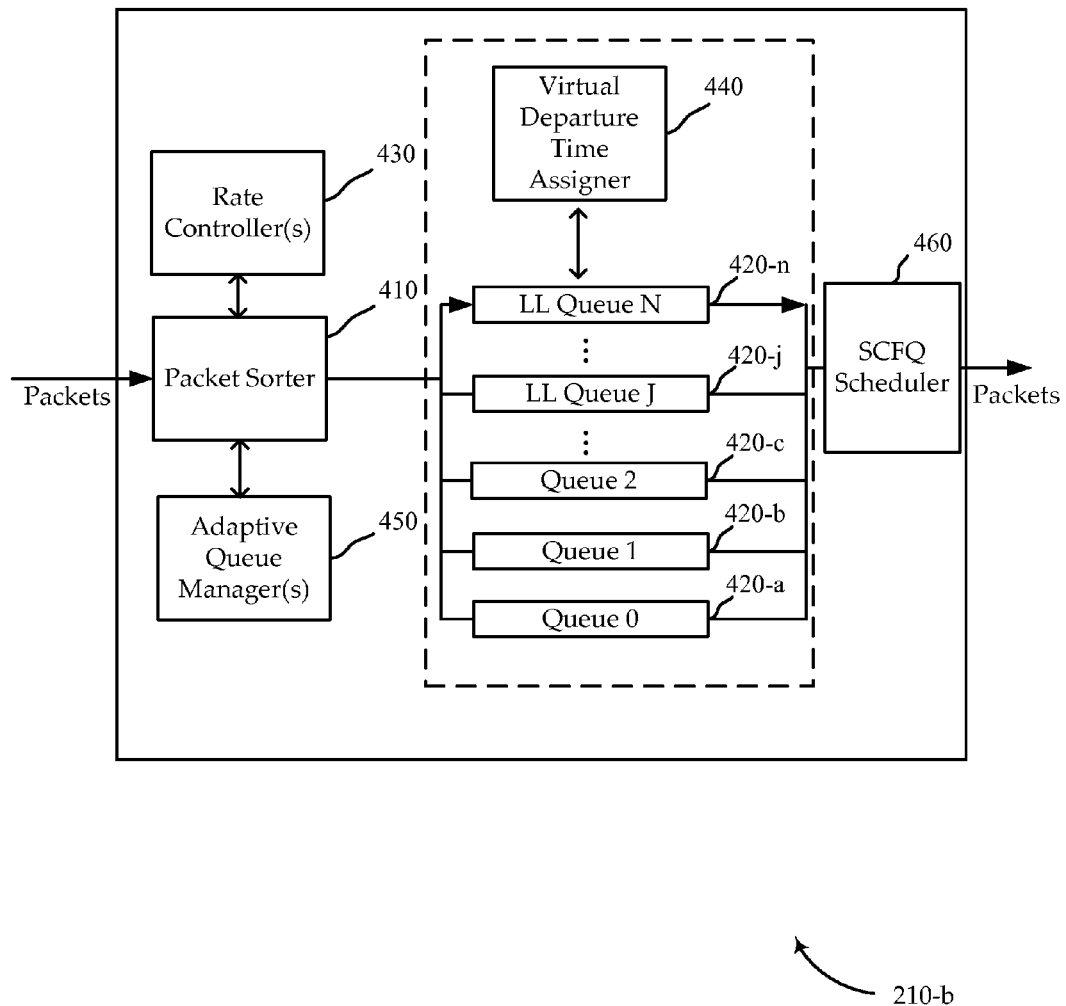
FIG. 4 is a simplified block diagram illustrating an example configuration of a scheduler module according to various embodiments.

Referring to FIG. 4, a simplified block diagram illustrates an example configuration of a scheduler module 210-b according to various embodiments. The scheduler module 210-b may be implemented in the gateway 115 of FIG. 1 or 2, scheduling packets for transmission downstream based on several novel self-clocked fair queue weighting and/or priority schemes described below. Low latency queuing may allow for one or more queues to be treated with high priority. Low latency queuing may be utilized to reduce delay and/or jitter in the transmission of packet sessions. Low latency queuing may be used to ensure low delay and/or jitter for voice and/or video packets, for example. Scheduler module 210-b may further implement aspects of scheduler module 210-a.

Scheduler module 210-b may include a variety of components, including queues such as 420-a, . . . , 420-n. Queues 420-a, . . . , 420-n may be the same as queues 320-a, . . . , 320-n of FIG. 3. One or more queues may be treated as low latency queues. For example, FIG. 4 shows queues 420-n and 420-j as low latency queues. Queues treated as low latency queues may be treated with higher priority than queues not treated as low latency queues. Scheduler module 210-b may include packet sorter 410 that may be configured to receive packets from multiple terminals in a satellite communication system. Packet sorter may assign packets from the different terminals to different queues such as queues 420-a, . . . , 420-n. Packet sorter 410 may be the same as sorter module 310 of FIG. 3. Scheduler module 210-b may also include a virtual departure time assigner 440, which may assign virtual departure times to packets. Virtual departure time assigner 440 may be the same as virtual departure time assigner module of FIG. 3. Scheduler module 210-b may include a rate controller 430, which may control the rate that packets are buffered into queues 420. In some embodiments, scheduler module 210-b may include multiple rate controllers 430, where a rate controller may be assigned to individual queues 420-a, . . . , 420-n. Furthermore, scheduler module 210-b may include an adaptive queue manager 450, which may be used to help manage queues as they begin to fill up with packets. Merely by way of example, adaptive queue manager 450 may randomly drop packets with a certain probability as a queue begins to fill up, utilizing methods of random early discard (RED). Adaptive queue manager 450 may utilize other methods such as dropping packets if a queue is full. Some embodiments of a scheduler module 210-b may include multiple adaptive queue managers 450, where an adaptive queue manager 450 may be associated with individual queues 420-a, . . . , 420-n. Scheduler module 210-b may also include a packet scheduler, such as the self-clocked fair queuing (SCFQ) scheduler 460. SCFQ scheduler 460 may schedule packets for transmission according to the virtual departure time order of the packets. These components are discussed in more detail below. SCFQ scheduler 460 may be the same as ordering module 360 of FIG. 3.

These components (410-460) may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each may also be implemented, in whole or in part, with instructions embodied in a computer-readable medium, formatted to be executed by one or more general or application specific processors. Thus, the module 210-b may include different types and configurations of memory (not shown), which may be integrated into the hardware or may be one or more separate components.

Low latency queuing techniques using self-clocked fair queuing may be achieved in several ways. In one embodiment, a queue such as queue 420-n may be treated as a low latency queue by setting its weight to infinity. This may also be achieved by setting 1/weight to zero. Similar effects may be achieved with low latency queues having very large weights compared to non-low latency queues, rather than setting with low latency queues weight to infinity or 1/weight to zero. Any queue or a set of queues may be treated as low latency queues using this self-clocked fair queue weight approach. Other queues that are not treated as low latency queues may be assigned weights less than infinity such that 1/weight is greater than zero. The low latency queues, such as queue 420-*n* and 420-*j*, have higher priority over these other queues that are not treated as low latency queues, such as queues 420-*a* and 420-*b*. When multiple queues are treated as low latency queues with their respective 1/weight set to zero, these low latency queues may be treated equally in some embodiments.

In some embodiments, a queue such as queue 420-*n* may be treated as a low latency queue by assigning virtual departure times to packets based on the virtual departure times of other packets. For example, if a packet A is assigned to queue 420-*n* when there is already a packet B in queue 420-*n*, then the packet A may be assigned the same virtual departure time as the previous packet B. If there is no packet in queue 420-*n*, then packet A may be assigned the virtual departure time of the last scheduled packet from any of the other queues 420. In some embodiments, when a packet from a low latency queue such as queue 420-*n* is assigned the same virtual departure time as a packet from another queue, such as queue 420-*a* for example, then the packet from 420-*n* may be scheduled for transmission before the packet from queue 420-*a*.

In another embodiment of low latency queuing using self-clocked fair queuing, several queues may be treated as low latency queues while not necessarily treating these low latency queues equally. Thus, a group of low latency queues may also be prioritized amongst themselves. Merely by way of example, two queues such as queue 420-*n* and 420-*j* may be treated as low latency queues, where one queue 420-*n* may be treated with higher priority than queue 420-*j*. This may be achieved by setting the weight N for queue 420-*n* such that 1/weight equals zero, while the weight J for queue 420-*j* may be set such that 1/weight J does not equal zero, but is significantly lower than the 1/weight factors for the non-low latency queues, such as queues 420-*a* and 420-*b*. For example, the 1/weight J may be set to around 100, while the 1/weight factor for the non-latency queues may be significantly higher, such as having values between 10,000 and 1,000,000,000. These techniques may be referred to as prioritized low latency queuing with self-clocked fair queuing. Prioritized low latency queuing may be generalized to more than just two low latency queues. For example, N queues may be treated as low latency queues, where the weights for each low latency queue may then be set to prioritize the low latency queues, while still giving them higher priority than the non-low latency queues. In some embodiments, some of the low latency queues may be treated equally as discussed above.

Low latency queuing techniques utilizing self-clocking fair queuing may determine and assign weights to queues in numerous ways. Weights assigned to queues may remain fixed for the queues, or may change over time or with certain traffic conditions. Weights may be changed to reflect the priority of a specific packet session. Furthermore, weights may be based on different traffic types that the packets may represent. For example, weights may depend on traffic types including, but not limited to, video, voice, and/or data. Weights may also be used to determine other factors, such as packet rate control and queue management.

Scheduler module 210-*b* may also include components to handle situations when a queue begins to fill up. Scheduler module 210-*b* shows an adaptive queue manager 450, which may drop packets from a queue in different situations. For example, adaptive queue manager 450 may randomly drop packets with certain probabilities as a queue starts to fill up, utilizing techniques such as random early discard. Adaptive queue managers 450 may be more appropriate for managing queues containing different types of traffic, such as data queues and video queues, in contrast to voice queues. Some embodiments may include multiple adaptive queue mangers, where each adaptive queue manager may be associated with a specific queue. Scheduler module 210-*a* may utilize other methods such as tail drop, where packets are dropped if a queue is already full.

Figure 5:
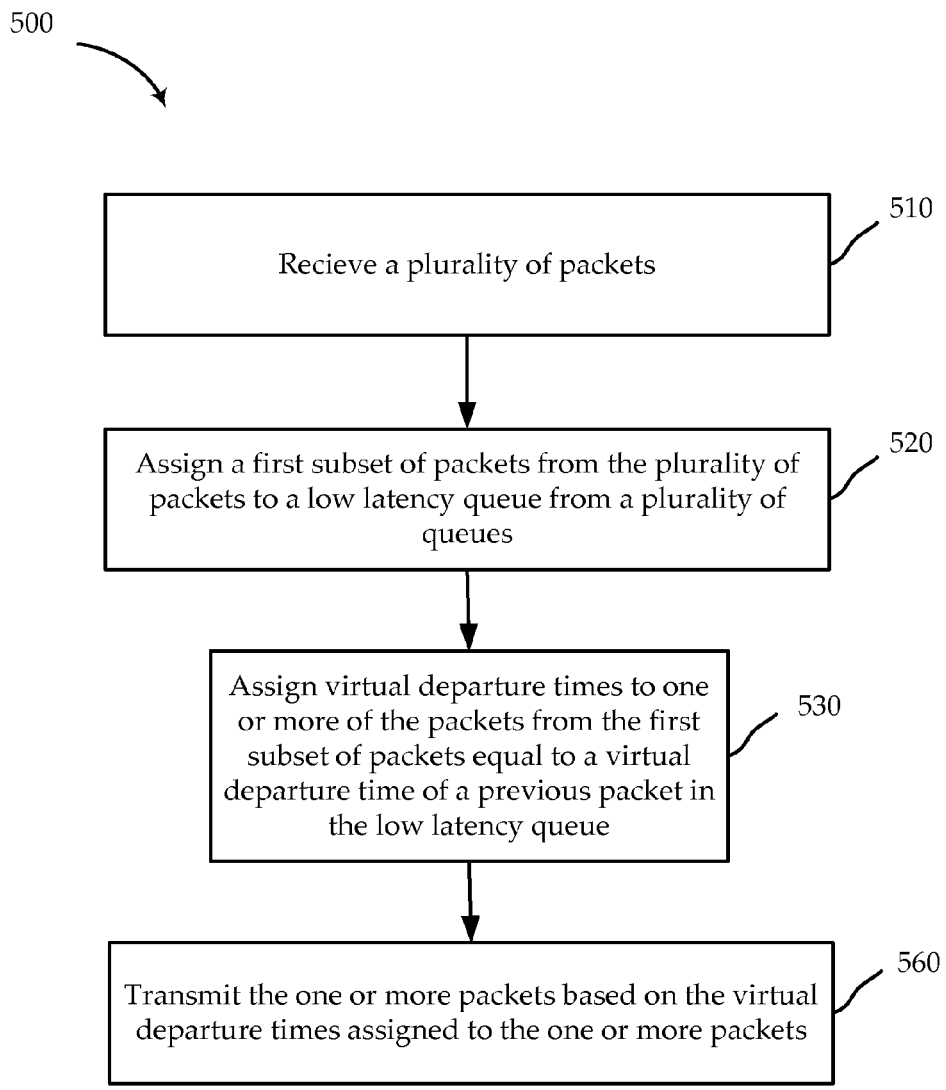
FIG. 5 is a flowchart illustrating a method of self-clocked fair queuing with low latency according to various embodiments.

FIG. 5 is a flowchart illustrating a method 500 of self-clocked fair queuing with low latency, according to various embodiments. Method 500 may, for example, be performed in whole or in part by the gateway 115 or 115-*a* of FIG. 1 or 2, respectively, or, more specifically, by a scheduler module such as 210 of FIG. 2, 210-*a* of FIG. 3, and/or 210-*b* of FIG. 4. Gateways 115 and/or scheduler modules 210, and their respective components, may thus also provide the means for performing method 500.

At block 510, multiple packets are received. At block 520, a first subset of packets from the multiple packets are assigned to a low latency queue from multiple queues. At block 530, virtual departure times may be assigned to one or more of the packets from the first subset of packets, where the virtual departure times are equal to a virtual departure time of a previous packet in the low latency queue. At block 560, the one or more packets are transmitted based on the virtual departure times assigned to the one or more packets.

Figure 6:
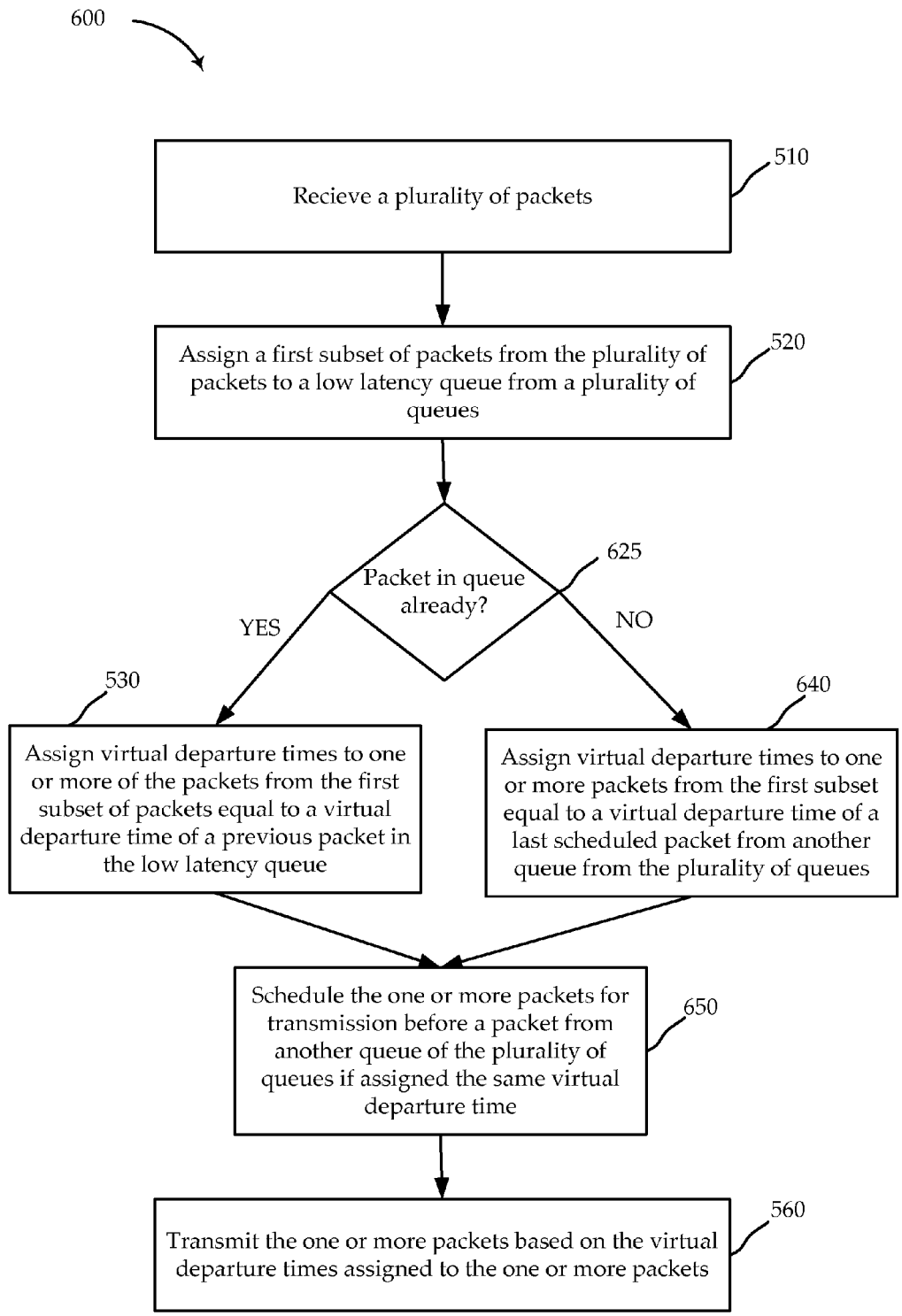
FIG. 6 is a flowchart illustrating a method of self-clocked fair queuing with low latency according to various embodiments.

FIG. 6 is a flowchart illustrating a method 600 of self-clocked fair queuing with low latency, according to various embodiments. Method 600 may, for example, be performed in whole or in part by the gateway 115 or 115-*a* of FIG. 1 or 2, respectively, or, more specifically, by a scheduler module such as 210 of FIG. 2, 210-*a* of FIG. 3, and/or 210-*b* of FIG. 4. Gateways 115 and/or scheduler modules 210, and their respective components, may thus also provide the means for performing method 500-*b*. Method 600 may includes steps from method 500.

At block 510, multiple packets are received. At block 520, a first subset of packets from the multiple packets are assigned to a low latency queue from multiple queues. At block 625, it may be determined whether there are packets in the low latency queue. At block 530, virtual departure times may be assigned to one or more of the packets from the first subset of packets, where the virtual departure times are equal to a virtual departure time of a previous packet in the low latency queue. In some embodiments, virtual departure times may be assigned to one or more packets from the first subset may equal a virtual departure time of a last scheduled packet from another or any other queue from the multiple queues as seen at block 640. Some embodiments may include a block 650 where the one or more packets may be scheduled for transmission before a packet from another queue of the multiple queues when the packets are assigned the same virtual departure time. At block 560, the one or more packets are transmitted based on the virtual departure times assigned to the one or more packets.

Figure 7:
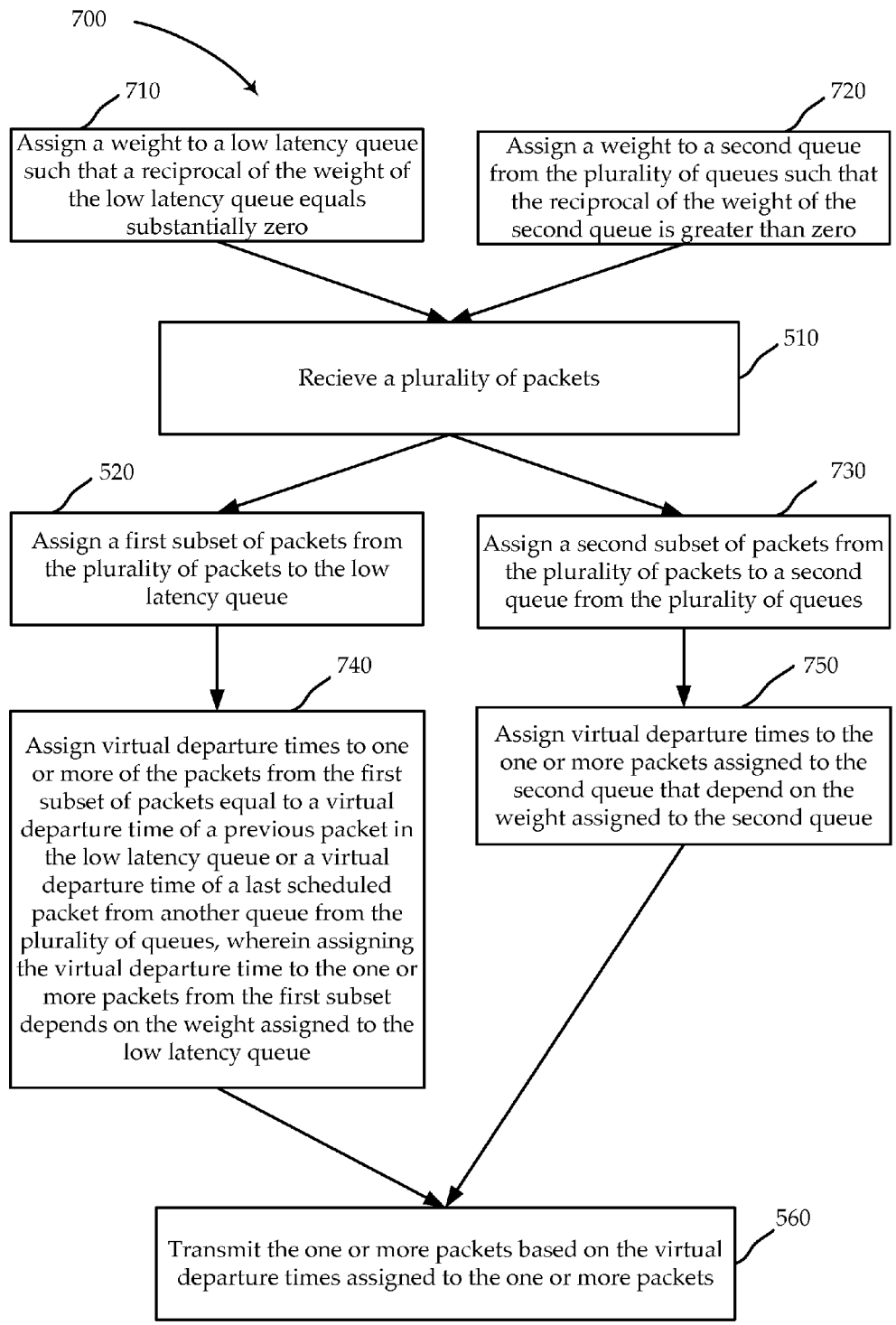
FIG. 7 is a flowchart illustrating a method of self-clocked fair queuing with low latency according to various embodiments.

FIG. 7 is a flowchart illustrating a method 700 of self-clocked fair queuing with low latency, according to various embodiments. Method 700 may, for example, be performed in whole or in part by the gateway 115 or 115-*a* of FIG. 1 or 2, respectively, or, more specifically, by a scheduler module such as 210 of FIG. 2, 210-a of FIG. 3, and/or 210-b of FIG. 4. Gateways 115 and/or scheduler modules 210, and their respective components, may thus also provide the means for performing method 700. Method 700 may includes steps from method 500 and/or method 600.

At block 710, a weight is assigned to a low latency queue such that a reciprocal of the weight of the low latency queue equals substantially zero. Substantially zero may include a number that a system, method, or device rounds to zero. In some embodiments, the weight may be infinite. At block 720, a weight is assigned to a second queue from the multiple queues such that the reciprocal of the weight of the second queue is greater than zero, or the weight less than infinite. At block 510, multiple packets are received. At block 520, a first subset of packets from the multiple packets are assigned to the low latency queue from multiple queues. At block 730, a second subset of packets from the multiple packets may be assigned to the second queue from the multiple of queues. At block 740, virtual departure times are assigned to one or more of the packets from the first subset of packets equal to a virtual departure time of a previous packet in the low latency queue or a virtual departure time of a last scheduled packet from another queue from the multiple queues. This is similar to steps 530 and 640 of methods 500 and 600. Assigning the virtual departure time to the one or more packets from the first subset depends on the weight assigned to the low latency queue. At block 750, virtual departure times are assigned to the one or more packets assigned to the second queue that depend on the weight assigned to the second queue. At block 560, the one or more packets are transmitted based on the virtual departure times assigned to the one or more packets.

Some embodiments of method 700 of low latency queuing utilizing self-clocked fair queuing may include assigning a weight to a third queue such that the weight of the third queue is at least two orders of magnitude larger than the weight assigned the second queue. In some embodiments, the weight assigned to at least one of the queues depends on a type of traffic of the packets received by the respective queue. In some embodiments, the weight assigned to at least one of the queues is changed to reflect the priority of the first subset of packets. In some embodiments, a weight depends on at least a source or a destination of the packets.

Figure 8:
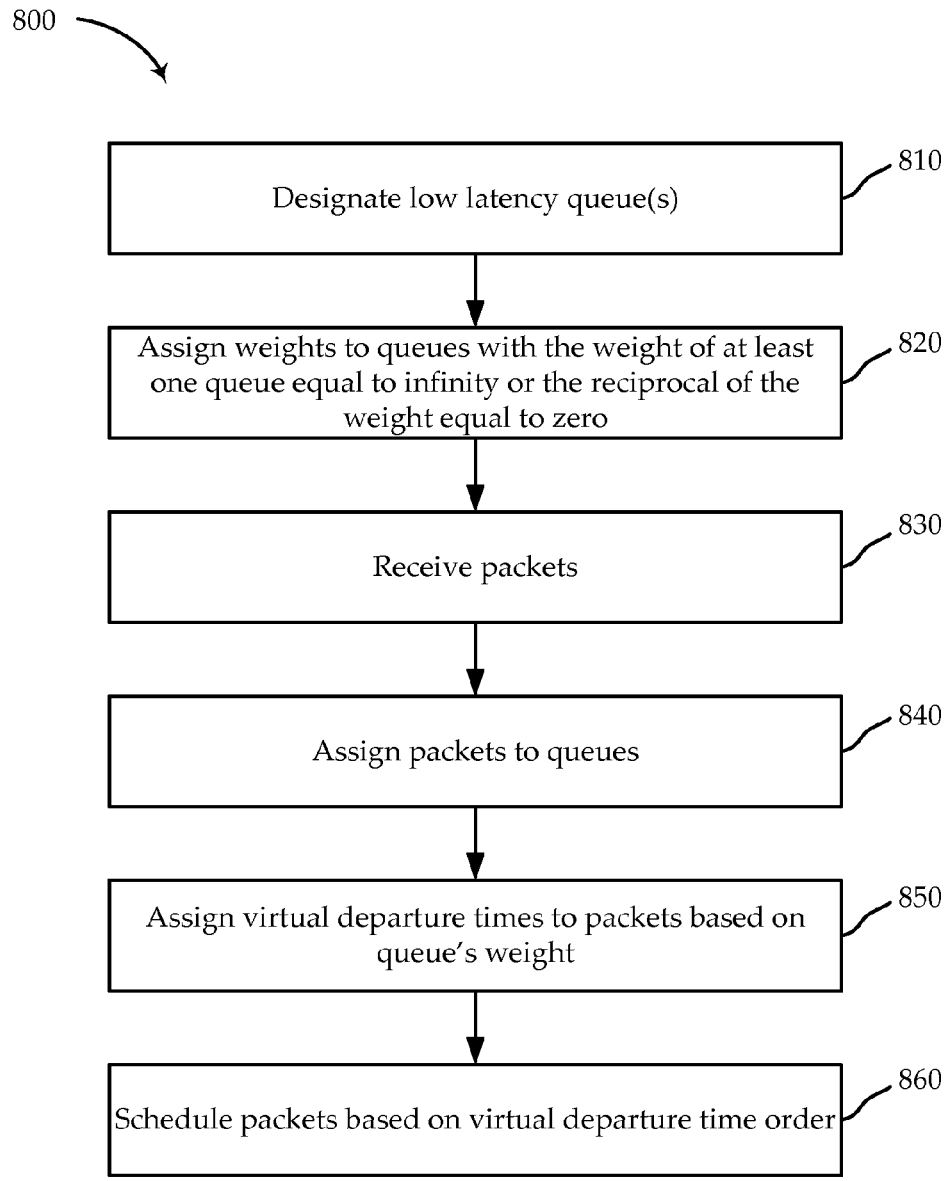
FIG. 8 is a flowchart illustrating a method of self-clocked fair queuing with low latency according to various embodiments.

FIG. 8 is a flowchart illustrating a method 800 of low latency queuing utilizing self-clocked fair queuing, according to various embodiments. Method 800 may, for example, be performed in whole or in part by the gateway 115 or 115-a of FIG. 1 or 2, respectively, or, more specifically, by a scheduler module such as 210 of FIG. 2, 210-a of FIG. 3, and/or 210-b of FIG. 4. Gateways 115 and/or scheduler modules 210, and their respective components, may thus also provide the means for performing method 800.

At block 810, queues that will be treated as low latency queues are determined. At block 820, weights are assigned to the queues, including the low latency queues. Low latency queues may be assigned weights based on the low latency queues being treated equally or being prioritized amongst themselves as discussed in more detail above. At least one of the low latency queues may be assigned a weight such that the reciprocal of the weight equals zero, or the weight itself is infinite. At block 830, packets are received and then assigned to queues at block 840. At block 850, packets are assigned virtual departure times based on the queue's weight determined in block 820. At block 860, packets are scheduled based on their virtual departure time order.

One skilled in the art will recognize that the steps of these methods may occur in several orders. Merely by way of example, determining which queues will be designated as low latency queues may occur while or even after packets are being received. Weights for the queues may also be assigned at different times.

Figure 9:
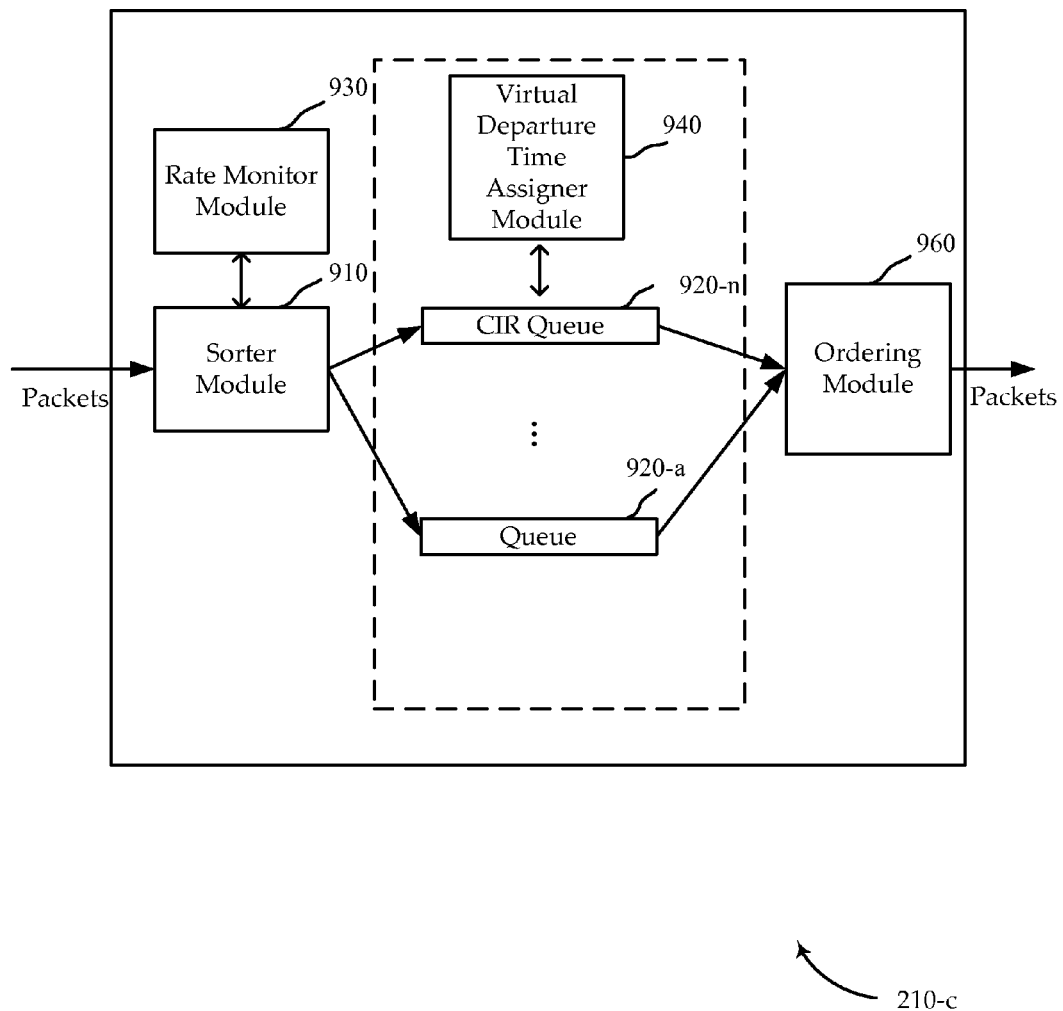
FIG. 9 is a simplified block diagram illustrating an example configuration of a scheduler module according to various embodiments.

II. Committed Information Rate Self-Clocked Fair Queuing:

Referring to FIG. 9, a simplified block diagram illustrates a configuration of a scheduler module 210-b according to various embodiments. The scheduler module 210-c may be implemented in the gateway 115 or 115-a of FIG. 1 or 2, respectively, scheduling packets for transmission downstream based on different self-clocked fair queuing weighting and/or priority schemes that include a committed information rate.

Scheduler module 210-c may include multiple queues 920-a, . . . , 920-n. One or more queues, such as queue 920-n, may be provided with guaranteed bandwidths, with excess bandwidth being shared based on weighted proportions. The guaranteed bandwidths may be represented in different ways, including, but not limited to, Megabits per second (Mbps). Guaranteed bandwidths may also be referred to as committed information rates (CIR).

Scheduler module 210-c may include other components, including a virtual departure time assigner module 940, a rate monitor module 930, a sorter module 910, and an ordering module 960, which may also be referred to as a packet scheduler or a self-clocked fair queuing scheduler in some embodiments. Some embodiments may include multiple versions of such components. For example, a scheduler module 210-b may include multiple rate monitor modules 930 such that a rate monitor module may be associated with an individual queue, such as queue 920-n.

These components (910-960) of scheduler module 210-c may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each may also be implemented, in whole or in part, with instructions embodied in a computer-readable medium, formatted to be executed by one or more general or application specific processors. Thus, scheduler module 210-c may include different types and configurations of memory (not shown), which may be integrated into the hardware or may be one or more separate components.

Sorter module 910 that may be configured to receive packets from multiple terminals in a satellite communication system. Sorter module may assign packets to the different queues such as queues 920-a, . . . , 920-n. Rate monitor module 930 may be associated with a queue (e.g., queue 920-n) provided with guaranteed bandwidth or committed information rate. Rate monitor module 930 may measure or otherwise identify the rate of packets being received at the associated queue 920-n. Based on the rate that the packets are received, packets may be marked in different ways, such as with different designations. Rate monitor module 930 may mark packets with the different designations, or another module, such as a designation module (not shown) may mark the packets with a designation, such as a first or second designation. For example, packets may be marked as conforming for a first designation or non-conforming for a second designation. A packet may be marked as conforming when the rate that packets are received at scheduler module 210-c may be less than or equal to a committed information rate for the queue 920. This rate of packets received may be an average rate. When the rate that packets are received exceeds the committed information rate for a queue, such as queue 920-n, packets associated with the excess rate may be marked as non-conforming. In some embodiments, an excess rate may be represented as a difference between a receiving rate and a committed information rate. Packets received up to the committed information rate may still be marked as conforming.

Scheduler module 210-c may assign a virtual departure time for the packets based on their respective designation, such as whether they are marked as conforming or non-conforming. As discussed above with respect to general methods of implementing self-clocked fair queuing with virtual departure times, each packet may be assigned a virtual departure that may depend in part on the size of the packet and a weight associated with a queue 920. For conforming packets for a queue, such as queue 920-n, conforming weight N may be set to infinity. Thus, the ratio of the packet size to the weight N may be set to zero for conforming packets. For non-conforming packets for queue 920-n, for example, a non-conforming weight N less than infinity may be used, such that the packet size divided by the weight N is greater than zero. In effect, conforming packets may be charged zero time. Rate monitor module 930 may be able to handle packets that are already marked as conforming or non-conforming.

In one embodiment, scheduler module 210-d may provide self-clocked fair queuing device with a committed information rate for a satellite communication system. Scheduler module 210-d may include sorter model 910 configured to identify a first set of packets among multiple received packets for a first queue, such as queue 920-n. Scheduler module 210-d may include a rate monitor module 930 configured to identify a receiving rate associated with the first set of packets. Rate monitor module 930 may be configured to associate a first designation with each packet of the first set of packets when the receiving rate is less than or equal the committed information rate. Rate monitor module 930 may be configured to associate the first designation with each packet from at least a first subset of the first set of packets and a second designation with each packet from at least a second subset of the first set of packets when the receiving rate is greater than the committed information rate. Virtual departure time assigner module 940 may be configured to assign virtual departure times to respective packets from the first set of packets based on the designation associated with respective packet such that packets associated with the first designation are assigned virtual departure times with earlier virtual departure times than packets associated with the second designation. Scheduler module 210-d may include an ordering module 960 configured to order and to transmit the respective packets based on their respective virtual departure times.

In some embodiments, virtual departure time assigner module 940 may associate the first designation with a first weight. Virtual departure time assigner module 940 may associate the second designation with a second weight. Virtual departure time assigner module 940 may assign virtual departure times to respective packets that depend on the weight associated with the respective designation.

In some embodiments, virtual departure time assigner module 940 may associate the first designation with the first weight such that a reciprocal of the first weight is substantially equal to zero. Virtual departure time assigner module 940 may associate the second designation with the second weight such that a reciprocal of the second weight is greater than zero. In some embodiments, virtual departure time assigner module 940 may associate the first designation with the first weight such that the first weight is at least two orders of magnitude larger than the second weight associated with the second designation.

In some embodiments, virtual departure time assigner module 940 may be further configured to assign the virtual departure time to at least one packet associated with the first designation equal the virtual departure time of a previous packet of the first queue. In some embodiments, virtual departure time assigner module 940 may be further configured to assign the virtual departure time to at least one packet associated with the first designation equal the virtual departure time of a last scheduled packet for another queue from the multiple queues.

In some embodiments, virtual departure time assigner module 940 may assign at least the first weight or the second weight that depends on at least a source or a destination of the packets. Some embodiments of a scheduler module may include an adaptive queue manager (not shown) configured to drop at least one packet assigned the second designation when the first queue is full.

Figure 10:
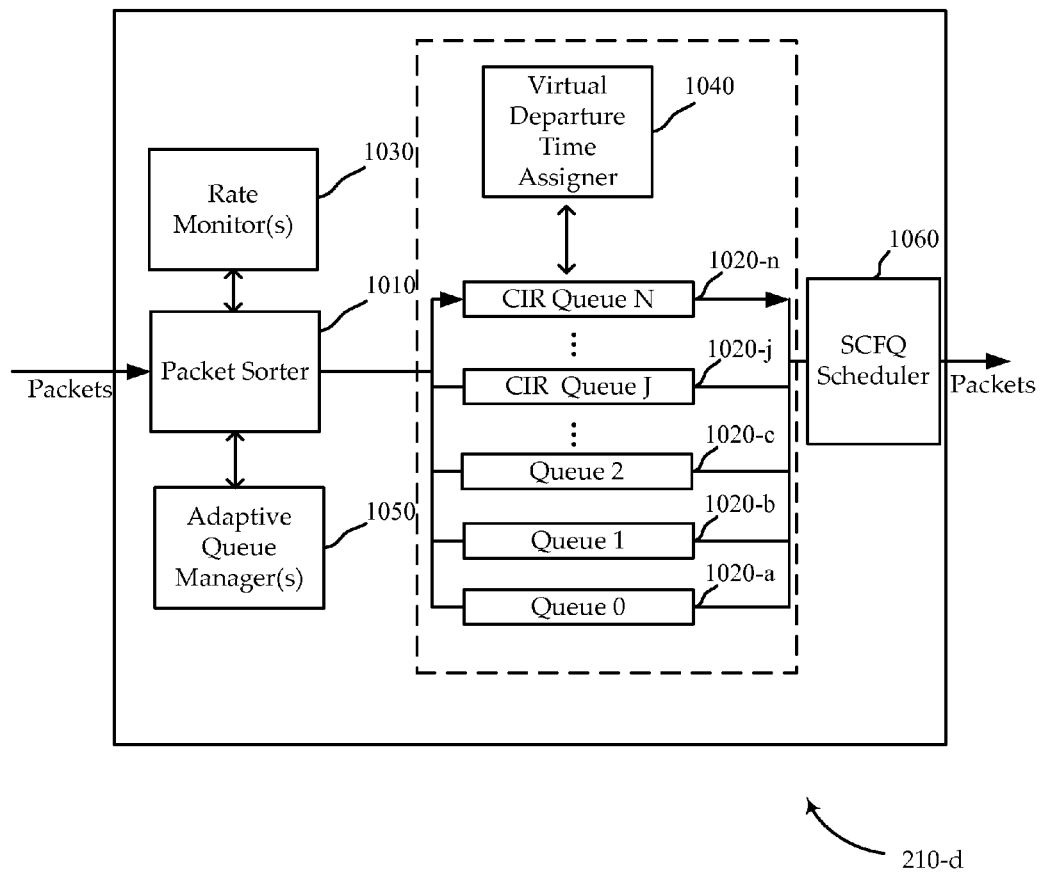
FIG. 10 is a simplified block diagram illustrating an example configuration of a scheduler module according to various embodiments.

Referring to FIG. 10, a simplified block diagram illustrates a configuration of a scheduler module 210-d according to various embodiments. The scheduler module 210-d may be implemented in the gateway 115 or 115-a of FIG. 1 or 2, respectively, scheduling packets for transmission downstream based on different self-clocked fair queuing weighting and/or priority schemes. Scheduler module 210-d may further implement aspects of scheduler module 210-c.

Scheduler module 210-d may include multiple queues 1020-a, ..., 1020-n. One or more queues (e.g., queues 1020-j and 1020-n) may be provided with guaranteed bandwidths, with excess bandwidth being shared based on weighted proportions. Queues 1020-a, ..., 1020-n may be the same as queues 920-a, ..., 920-n. In one embodiment, all queues 1020 may be provided with guaranteed bandwidths. The guaranteed bandwidths may be represented in different ways, including, but not limited to, Megabits per second (Mbps). Guaranteed bandwidths may also be referred to as committed information rates (CIR).

Scheduler module 210-d may include other components, including a virtual departure time assigner 1040, a packet sorter 1010, a rate monitor 1030, an adaptive queue manager 1050, and/or a packet scheduler such as a self-clocked fair queuing scheduler 1060. Some embodiments may include multiple versions of such components. For example, scheduler module 210-d may include multiple rate monitors 1030 and/or multiple adaptive queue managers 1050, such that rate monitor 1030 and/or adaptive queue manager 1050 may be associated with an individual queue, such as 1020-n.

These components (1010-1060) of scheduler module 210-d may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each may also be implemented, in whole or in part, with instructions embodied in a computer-readable medium, formatted to be executed by one or more general or application specific processors. Thus, the scheduler module 210-d may include different types and configurations of memory (not shown), which may be integrated into the hardware or may be one or more separate components.

Rate monitor 1030 may be associated with a queue (e.g., queue 1020-n) provided with guaranteed bandwidth or committed information rate. Rate monitor 1030 may measure or otherwise identify the rate of packets being received at the associated queue 1020-n. Based on the rate that the packets are received, packets may be marked in different ways, such as with different designations. For example, packets may be marked as conforming or non-conforming. A packet may be marked as conforming when the rate that packets are received at scheduler module 210-d may be less than or equal to the committed information rate for queue 1020. This rate of packets received may be an average rate. When the rate that packets are received exceeds the committed information rate for a queue, such as 1020-n, packets associated with the excess rate may be marked as non-conforming. In some embodiments, an excess rate may be represented as a difference between a receiving rate and a committed information rate. Packets received up to the committed information rate may still be marked as conforming.

Scheduler module 210-d may assign virtual departure times for the packets based on whether they are marked as conforming or non-conforming. As discussed above with respect to general methods of implementing self-clocked fair queuing with virtual departure times, each packet may be assigned a virtual departure that may depend in part on the size of the packet and a weight associated with a queue 1020. For conforming packets for a queue, such as queue 1020-n, conforming weight N may be set to infinity. Thus, the ratio of the packet size to the weight N may be set to zero for conforming packets. For non-conforming packets for queue 1020-n, for example, a non-conforming weight N less than infinity may be used, such that the packet size divided by the weight N is greater than zero. In effect, conforming packets may be charged zero time. Rate monitor 1030 may be able to handle packets that are already marked as conforming or non-conforming.

Multiple queues (such as queue 1020-j and 1020-n) may be provided with committed information rates. Each queue 1020 with a committed information rate may have the same conforming weight. Queues 1020 with committed information rates may have the same or different non-conforming weights. In some embodiments, all the queues 1020 of scheduler module 210-d may have a committed information rate. Queues 1020 may have different committed information rates. The committed information rate for a queue 1020 may depend on the type of traffic it may receive, such as data, voice, and/or video, merely by way of example. The committed information rate may also depend on which subscriber terminal 130 the packets for a queue 1020 are received from.

Embodiments of scheduler module 210-d utilizing self-clocked fair queue weighting and/or priority techniques may also be able to handle circumstances where there may not be enough bandwidth available to meet a committed information rate for at least one queue 1020. Scheduler module 210-d may utilize additional weights associated with packets marked as conforming that are not set at infinity, but rather to a large value compared to the weights associated with non-conforming packets. For example, a queue, such as queue 1020-j, may have a weight associated with a committed information rate, WCIRj, for conforming packets when there is insufficient bandwidth to meet the committed information rate. Queue 1020-j may also have another weight, Wj, for non-conforming packets when there is insufficient bandwidth to meet the committed information rate. The set of WCIRj values for a set of queues 1020 may be a set of weights used to share a committed information rate. The values 1/WCIRj may be relatively low compared to the values 1/Wj. Merely by way of example, for queue 1020-j, a value for 1/WCIRj may be between 0 and 100 while the value for 1/Wj may be between 10,000 and 1,000,000,000. In some embodiments, a queue with a committed information rate may have a set of weights associated with it; one set of weights may be utilized when there is adequate bandwidth to meet the queue's committed information rate, while the other set may be utilized when there is not adequate bandwidth to meet the queue's committed information rate.

Committed information rate queuing techniques utilizing self-clocking fair queuing may determine and assign weights to queues in numerous ways. Weights assigned to queues may remain fixed for the queues, or may change depending on time or traffic conditions. Weights may be changed to reflect the priority of a specific packet session. Furthermore, weights may be based on different traffic types than the packets may represent. For example, weights may depend on traffic types including, but not limited to, video, voice, and/or data. Weights may also be used to determine other factors, such as packet rate control and queue management.

Scheduler module 210-d may also have an adaptive queue manager 1050. In some embodiments, scheduler module 210-d may have multiple adaptive queue managers 1050, such that each adaptive queue manager 1050 may be associated with a specific queue 1020. In some embodiments, adaptive queue manager 1050 may randomly drop packets with certain probabilities as a queue begins to fill up using techniques such as Random Early Discard (RED). Non-conforming packets may be preferentially discarded compared to conforming packets. There are several ways to implement such adaptive queue management, including, but not limited to, using weighted random early detection (WRED) or guaranteed rate I/O (GRIO) algorithms. Scheduler module 210-d may utilize other methods for handling queues that are filling up or are full. For example, variations on a tail-drop method may occur where packets are dropped when a queue is full.

Figure 11:
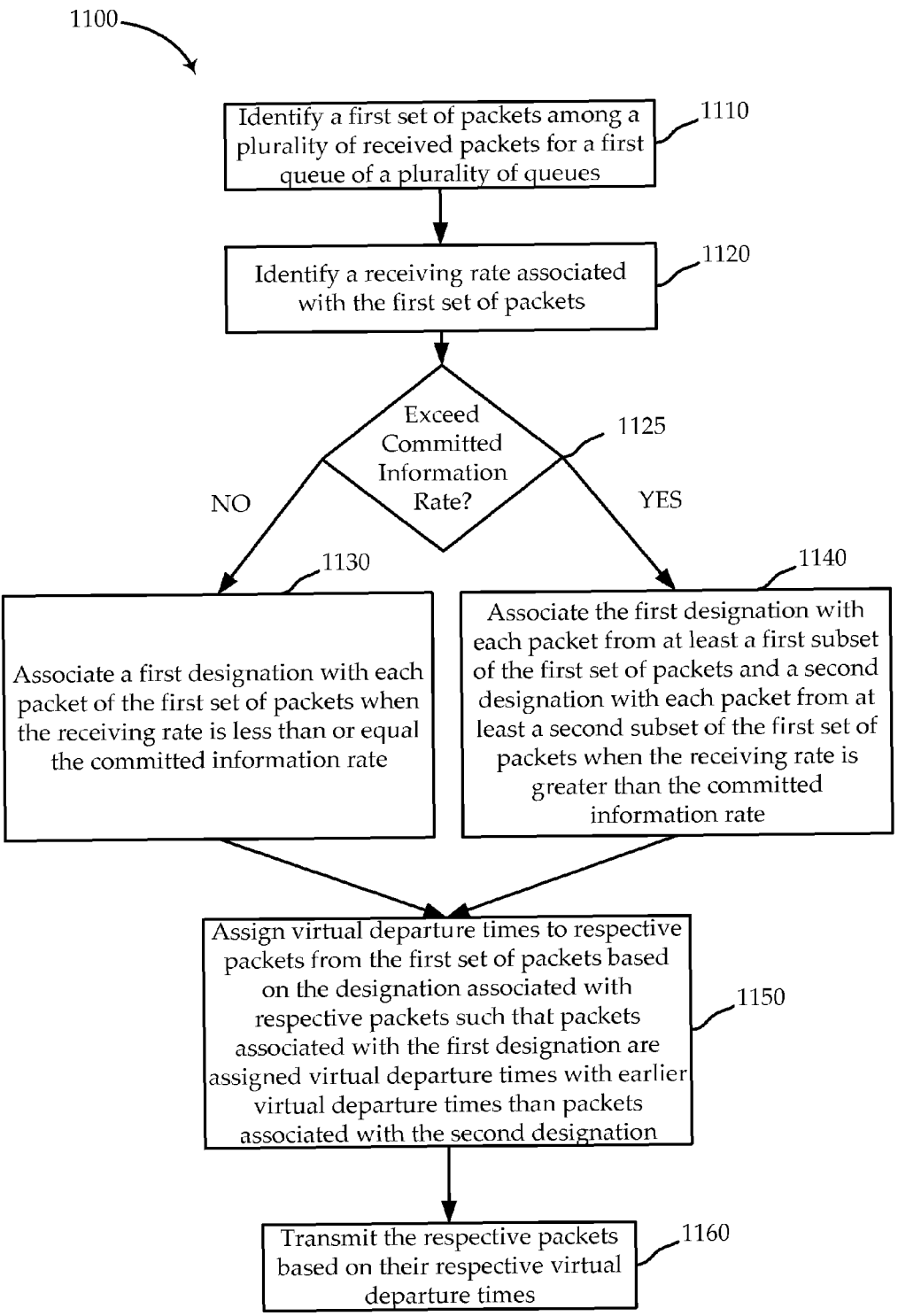
FIG. 11 is a flowchart illustrating a method of self-clocked fair queuing with a committed information rate according to various embodiments.

FIG. 11 is a flowchart illustrating a method 1100 of self-clocked fair queuing with a committed information rate for a satellite communication system according to various embodiments. The method may, for example, be performed in whole or in part by the gateway 115 or 115-a of FIG. 1 or 2, respectively, or, more specifically, by a scheduler module such as 210 of FIG. 2, 210-c of FIG. 9, and/or 210-d of FIG. 10. Gateways 115 and/or scheduler modules 210, and their respective components, may thus also provide the means for performing method 1100.

At block 1110, a first set of packets may be identified among multiple received packets for a first queue of multiple queues. At block 1120, a receiving rate associated with the first set of packets may be identified. At block 1125, it may determined whether the receiving rate exceeds the committed information rate. At block 1130, a first designation may be associated with each packet of the first set of packets when the receiving rate is less than or equal the committed information rate. At block 1140, the first designation may be associated with each packet from at least a first subset of the first set of packets and a second designation with each packet from at least a second subset of the first set of packets when the receiving rate is greater than the committed information rate. At block 1150, virtual departure times may be assigned to respective packets from the first set of packets based on the designation associated with respective packets such that packets associated with the first designation are assigned virtual departure times with earlier virtual departure times than packets associated with the second designation. At block 1160, the respective packets may be transmitted based on their respective virtual departure times.

In some embodiments of method 1100 of self-clocked fair queuing with a committed information rate for a satellite communication system, the second subset of the first set of packets may represent packets received as part of an excess rate, where the excess rate represents the difference between the receiving rate and the committed information rate.

Figure 12:
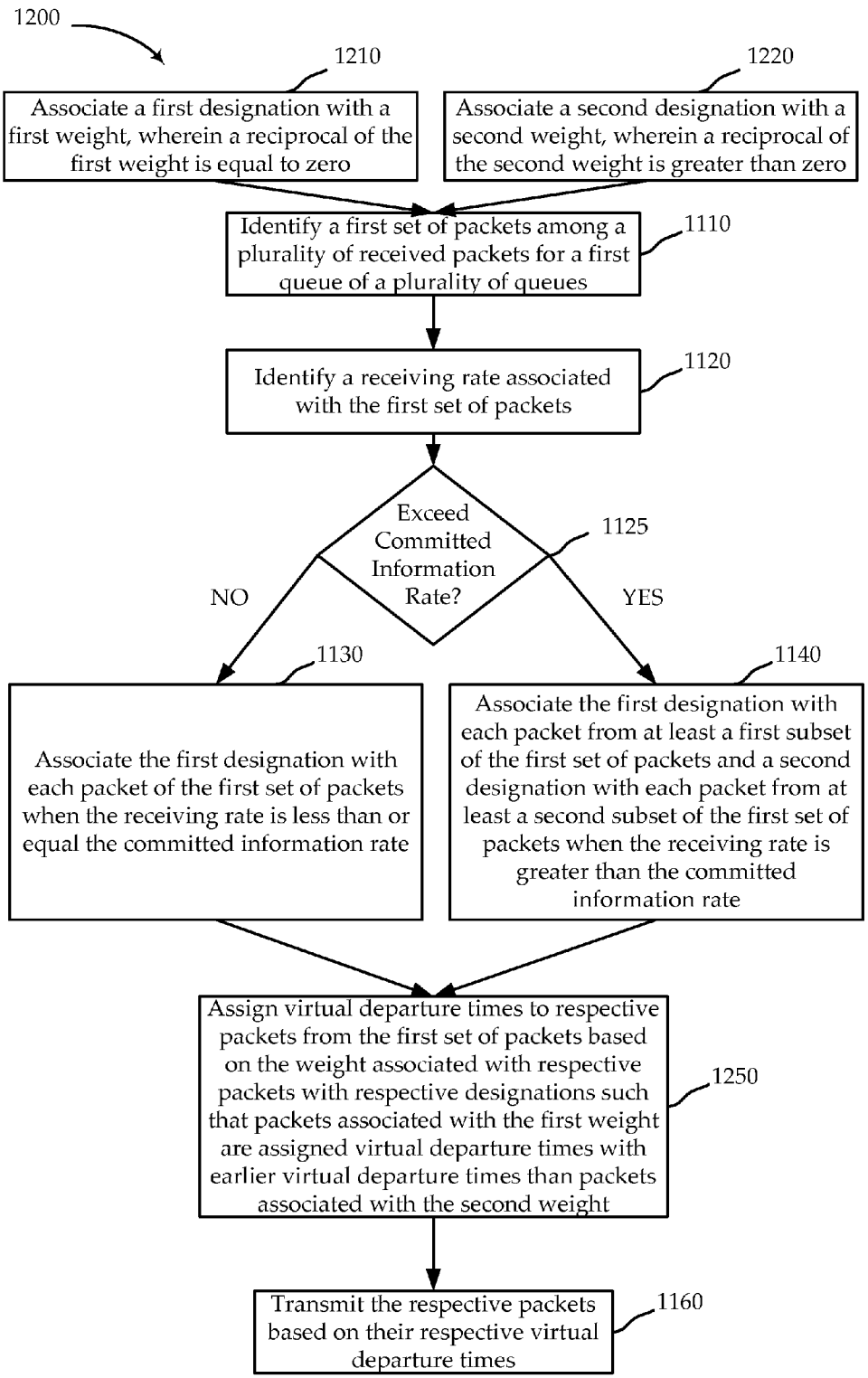
FIG. 12 is a flowchart illustrating a method of self-clocked fair queuing with a committed information rate according to various embodiments.

FIG. 12 is a flowchart illustrating a method 1200 of self-clocked fair queuing with a committed information rate for a satellite communication system according to various embodiments. Method 1200 may, for example, be performed in whole or in part by the gateway 115 or 115-*a* of FIG. 1 or 2, respectively, or, more specifically, by a scheduler module such as 210 of FIG. 2, 210-*c* of FIG. 9, and/or 210-*d* of FIG. 10. Gateways 115 and/or scheduler modules 210, and their respective components, may thus also provide the means for performing method 1200. Method 1200 may includes steps associated with method 1100.

At block 1210, a first designation may be associated with a first weight such that a reciprocal of the first weight is substantially equal to zero. In some embodiments, the first weight may be represented as infinite. At block 1220, a second designation may be associated with a second weight such that a reciprocal of the second weight is greater than zero. At block 1110, a first set of packets may be identified among multiple received packets for a first queue of multiple queues. At block 1120, a receiving rate associated with the first set of packets may be identified. At block 1125, it may determined whether the receiving rate exceeds the committed information rate. At block 1130, the first designation may be associated with each packet of the first set of packets when the receiving rate is less than or equal the committed information rate. At block 1140, the first designation may be associated with each packet from at least a first subset of the first set of packets and the second designation with each packet from at least a second subset of the first set of packets when the receiving rate is greater than the committed information rate. At block 1250, virtual departure times may be assigned to respective packets from the first set of packets based on the weight associated with respective packet with respective designations such that packets associated with the first designation are assigned virtual departure times with earlier virtual departure times than packets associated with the second designation. At block 1160, the respective packets may be transmitted based on their respective virtual departure times.

In some embodiments, the first weight may be set such that the reciprocal of the weight is greater than zero while the weight is greater than the weight of the second weight. In some embodiments, the first weight may be at least two orders of magnitude larger than the second weight.

In some embodiments, the weights, such as the first and/or second weight, may depend on a source and/or a destination of the packets. In some embodiments, packets assigned the second designation may be dropped when the first queue is full. In some embodiments, a weight assigned to at least one of the queues may depend on a type of traffic of the packets received by the respective queue. In some embodiments, the weight assigned to at least one of the queues may change over time to reflect the priority of the subset of packets.

Some embodiments may include having the virtual departure time assigned to at least one packet associated with the first designation that equals the virtual departure time of a previous packet of the first queue. In some cases, the virtual departure time assigned to at least one packet associated with the first designation may equal the virtual departure time of a last scheduled packet for another or any other queue from the multiple queues.

Figure 13:
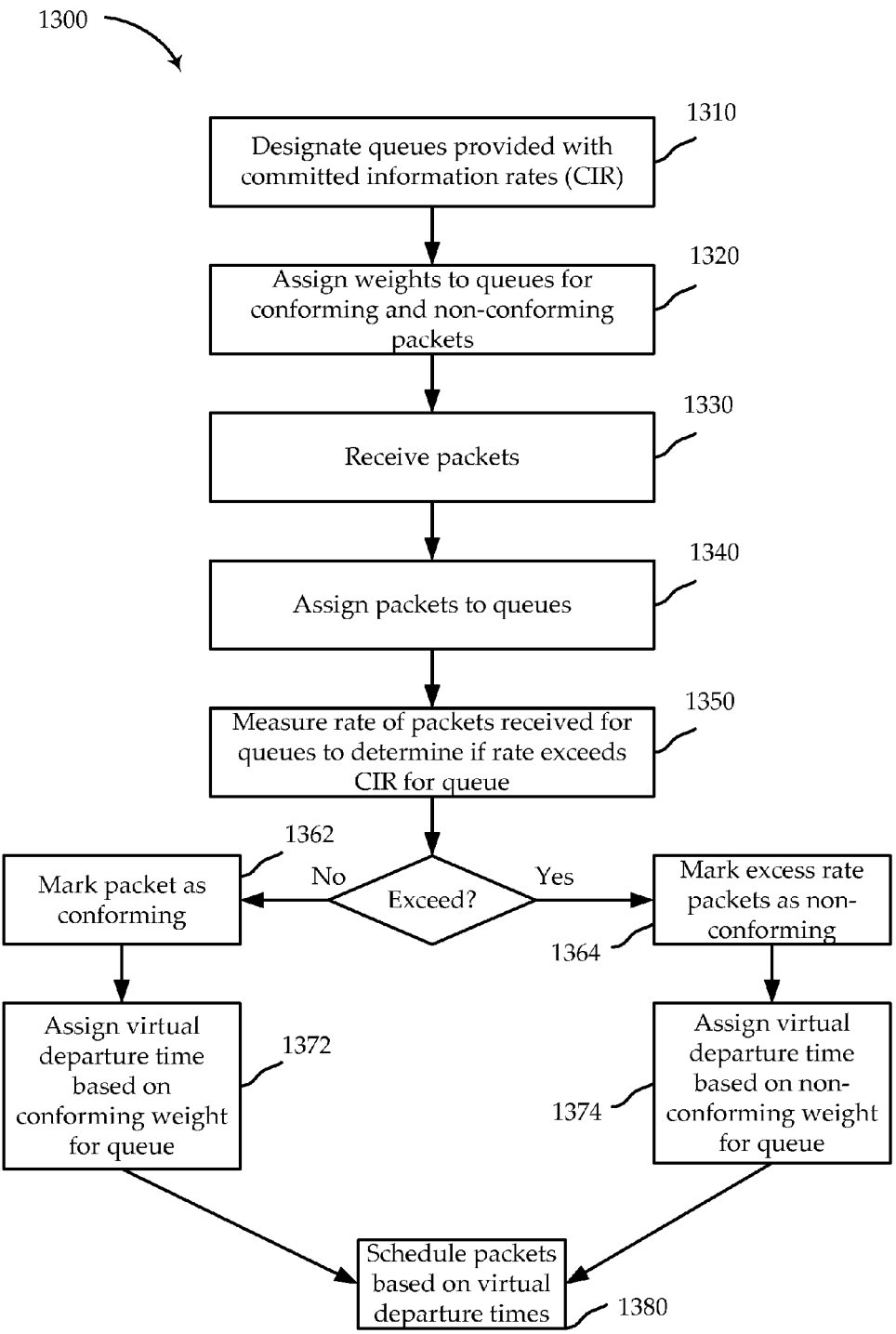
FIG. 13 is a flowchart illustrating a method of self-clocked fair queuing with a committed information rate according to various embodiments.

FIG. 13 is a flowchart illustrating a method 1300 of committed information rate queuing utilizing self-clocked fair queuing according to various embodiments. The method may, for example, be performed in whole or in part by the gateway 115 or 115-*a* of FIG. 1 or 2, respectively, or, more specifically, by a scheduler module such as 210 of FIG. 2, 210-*c* of FIG. 9, and/or 210-*d* of FIG. 10. Gateways 115 and/or scheduler modules 210, and their respective components, may thus also provide the means for performing method 1300.

At block 1310, queues that may be provided with committed information rates are determined. At block 1320, weights are assigned to the queues. Weights may be assigned for individual queues for both conforming and non-conforming packets. In addition, weights may be assigned for conforming and non-conforming packets for situations when there may not be enough bandwidth available to meet the committed information rate for the queues. Queues that may not have a committed information rate may also be assigned a weight. At block 1330, packets are received and then assigned to queues at block 1340. At block 1350, the rate at which packets are being received for queues may be determined to see if the rate exceeds the committed information rate for a queue. In cases where the committed information rate is not exceeded, block 1362 marks packets as conforming. Block 1372 then assigns a virtual departure time for the packet based on the conforming weight for the queue. In cases where there may be inadequate bandwidth to meet the committed information rate for the queue, a different weight may be utilized as discussed above. In cases where the committed information rate is exceeded, block 1364 marks packets as non-conforming for those packets associated with an excess rate, where in the excess rate represents a difference between the receiving rate and the committed information rate. Packets received up to the committed information rate may still be marked as conforming. Packets are assigned virtual departure times at block 1374 based on the queue's non-conforming weight determined in block 1320. At block 1380, packets are scheduled based on their virtual departure time order.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of self-clocked fair queuing with a committed information rate for a satellite communication system, the method comprising:
   identifying a first set of packets among a plurality of received packets for a first queue of a plurality of queues;
   identifying a receiving rate associated with the first set of packets;
   associating a first designation with each packet of the first set of packets when the receiving rate is less than or equal to the committed information rate;
   associating the first designation with each packet from at least a first subset of the first set of packets and a second designation with each packet from at least a second subset of the first set of packets when the receiving rate is greater than the committed information rate;
   associating the first designation with a first weight and the second designation with a second weight;
   assigning virtual departure times to respective packets from the first set of packets based on the respective weight associated with the respective designation associated with each respective packet such that packets associated with the first designation are assigned virtual departure times with earlier virtual departure times than packets associated with the second designation; and
   transmitting the respective packets based on their respective virtual departure times.

2. The method of claim 1, wherein the second subset of the first set of packets represents one or more packets received as part of an excess rate, where the excess rate represents a difference between the receiving rate and the committed information rate.

3. The method of claim 1, wherein:
   associating the first designation with the first weight comprises the first weight such that a reciprocal of the first weight is substantially equal to zero; and
   associating the second designation with the second weight comprises the second weight such that a reciprocal of the second weight is greater than zero.

4. The method of claim 1, wherein:
   the first weight is at least two orders of magnitude larger than the second weight.

5. The method of claim 1 wherein:
   a virtual departure time assigned to at least one packet associated with the first designation equals a virtual departure time of a previous packet of the first queue.

6. The method of claim 1, wherein:
   a virtual departure time assigned to at least one packet associated with the first designation equals a virtual departure time of a last scheduled packet for another queue from the plurality of queues.

7. The method of claim 1, wherein at least the first weight or the second weight depends on at least a source or a destination of the first set of packets.

8. The method of claim 1, further comprising:
   dropping at least one packet assigned the second designation when the first queue is full.

9. The method of claim 1, wherein a weight assigned to at least one of the queues depends on a type of traffic of packets received by the at least one of the queues.

10. The method of claim 1, wherein a weight assigned to at least one of the queues is changed to reflect priority of packets received by the at least one of the queues.

11. A self-clocked fair queuing device with a committed information rate for a satellite communication system, the device comprising:
    a sorter module configured to identify a first set of packets among a plurality of received packets for a first queue;
    a rate monitor module configured to:
       identify a receiving rate associated with the first set of packets;
       associate a first designation with each packet of the first set of packets when the receiving rate is less than or equal to the committed information rate; and
       associate the first designation with each packet from at least a first subset of the first set of packets and a second designation with each packet from at least a second subset of the first set of packets when the receiving rate is greater than the committed information rate; and
    a virtual departure time assigner module configured to:
       associate the first designation with a first weight and the second designation with a second weight; and
       assign virtual departure times to respective packets from the first set of packets based on the respective weight associated with the respective designation associated with each respective packet such that packets associated with the first designation are assigned virtual departure times with earlier virtual departure times than packets associated with the second designation; and
    an ordering module configured to order the respective packets for transmission based on their respective virtual departure times.

12. The device of claim 11, wherein the virtual departure time assigner module is further configured to:
    associating the first designation with the first weight comprises the first weight such that a reciprocal of the first weight is substantially equal to zero; and
    associating the second designation with the second weight comprises the second weight such that a reciprocal of the second weight is greater than zero.

13. The device of claim 11, wherein the virtual departure time assigner module associates the first designation with the first weight such that the first weight is at least two orders of magnitude larger than the second weight associated with the second designation.

14. The device of claim 11, wherein the virtual departure time assigner module is further configured to assign a virtual departure time to at least one packet associated with the first designation equal to a virtual departure time of a previous packet of the first queue.

15. The device of claim 11, wherein the virtual departure time assigner module is further configured to assign a virtual departure time to at least one packet associated with the first designation equal to a virtual departure time of a last scheduled packet for another queue.

16. The device of claim 11, wherein at least the first weight or the second weight depends on at least a source or a destination of the first set of packets.

17. The device of claim 11, further comprising a queue manager configured to drop at least one packet assigned the second designation when the first queue is full.

18. A self-clocked fair queuing device with a committed information rate for a satellite communication system, the device comprising:
   a means for identifying a first set of packets among a plurality of received packets for a first queue of a plurality of queues;
   a means for identifying a receiving rate associated with the first set of packets;
   a means for associating a first designation with each packet of the first set of packets when the receiving rate is less than or equal to the committed information rate;
   a means for associating the first designation with each packet from at least a first subset of the first set of packets and a second designation with each packet from at least a second subset of the first set of packets when the receiving rate is greater than the committed information rate;
   a means for associating the first designation with a first weight and the second designation with a second weight;
   a means for assigning virtual departure times to respective packets from the first set of packets based on the respective weight associated with the respective designation associated with each respective packet such that packets associated with the first designation are assigned virtual departure times with earlier virtual departure times than packets associated with the second designation; and
   a means for transmitting the respective packets based on their respective virtual departure times.

19. The device of claim 18, wherein:
   the means for associating the first designation with the first weight comprises the first weight such that a reciprocal of the first weight is substantially equal to zero; and
   the means for associating the second designation with the second weight comprises the second weight such that a reciprocal of the second weight is greater than zero.

20. The device of claim 18, wherein:
   the first weight is at least two orders of magnitude larger than the second weight.

21. The device of claim 18, wherein:
   a virtual departure time assigned to at least one packet associated with the first designation equals a virtual departure time of a previous packet of the first queue.

22. The device of claim 18, wherein:
   a virtual departure time assigned to at least one packet associated with the first designation equals a virtual departure time of a last scheduled packet for another queue from the plurality of queues.

23. The device of claim 18, wherein at least the first weight or the second weight depends on at least a source or a destination of the first set of packets.

24. The device of claim 18, further comprising:
   a means for dropping at least one packet assigned the second designation when the first queue is full.

\* \* \* \* \*